United States Patent
Suhail et al.

(10) Patent No.: US 11,909,742 B2
(45) Date of Patent: *Feb. 20, 2024

(54) MANAGING ADMIN CONTROLLED ACCESS OF EXTERNAL RESOURCES TO GROUP-BASED COMMUNICATION INTERFACES VIA A GROUP-BASED COMMUNICATION SYSTEM

(71) Applicant: Salesforce, Inc., San Francisco, CA (US)

(72) Inventors: Salman Suhail, San Francisco, CA (US); Saurabh Sahni, Sunnyvale, CA (US); Kefan Xie, Toronto (CA); Emilio Aurea, Albany, CA (US); Shilpi Sanchetee, San Francisco, CA (US); Nupur Goyal, San Francisco, CA (US); Carly Robinson, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/676,054

(22) Filed: Feb. 18, 2022

(65) Prior Publication Data
US 2022/0286463 A1 Sep. 8, 2022

Related U.S. Application Data

(63) Continuation of application No. 16/456,675, filed on Jun. 28, 2019, now Pat. No. 11,258,800.

(51) Int. Cl.
*H04L 9/40* (2022.01)
*H04L 9/32* (2006.01)

(52) U.S. Cl.
CPC .......... *H04L 63/104* (2013.01); *H04L 9/3213* (2013.01); *H04L 63/105* (2013.01); *H04L 63/20* (2013.01)

(58) Field of Classification Search
CPC ... H04L 63/104; H04L 9/3213; H04L 63/105; H04L 63/20
See application file for complete search history.

(56) References Cited

U.S. PATENT DOCUMENTS 8,601,263 B1 12/2013 Shankar et al.
8,856,865 B1 10/2014 Martini
(Continued)

OTHER PUBLICATIONS

David Auberbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

*Primary Examiner* — Cheng-Feng Huang
(74) *Attorney, Agent, or Firm* — Lee & Hayes, P.C.

(57) ABSTRACT

Embodiments of the present disclosure relate to managing admin-controlled access of external resources to group-based communication interfaces associated with an organization, via a group-based communication system including APIs for improved external resource permissioning, provisioning, and access handling. Embodiments include methods, computer program products, apparatuses, and systems configured to receive an external resource access request, determine an organization identifier, obtain an admin response indication, set an external resource permission status for the external resource based on the admin response indication, and cause rendering of the requested group-based communication interface based on the admin response indi- (Continued)

cation. Embodiments further relate to provisioning and handling requests for services associated with an external resource by managing one or more single-interface access tokens linked to a multi-interface access token.

20 Claims, 12 Drawing Sheets

(56) References Cited

U.S. PATENT DOCUMENTS

| | | | |
|---|---|---|---|
| 9,335,958 B2 | 5/2016 | Anno et al. | |
| 9,940,394 B1 | 4/2018 | Grant et al. | |
| 2005/0289342 A1* | 12/2005 | Needham | G06F 21/6227 713/169 |
| 2006/0041661 A1* | 2/2006 | Erikson | G06F 16/9024 707/E17.115 |
| 2008/0104665 A1* | 5/2008 | Naldurg | G06F 21/577 726/2 |
| 2008/0301766 A1* | 12/2008 | Makino | G06F 21/51 726/1 |
| 2011/0126207 A1 | 5/2011 | Wipfel et al. | |
| 2011/0150222 A1 | 6/2011 | Bertin | |
| 2012/0096521 A1 | 4/2012 | Peddada | |
| 2012/0190363 A1* | 7/2012 | Maeda | H04W 60/00 455/435.1 |
| 2013/0212650 A1* | 8/2013 | Dabbiere | H04L 63/10 726/4 |
| 2014/0282586 A1 | 9/2014 | Shear et al. | |
| 2014/0343989 A1* | 11/2014 | Martini | H04L 63/104 705/7.17 |
| 2015/0074743 A1 | 3/2015 | Ilieva et al. | |
| 2015/0294377 A1 | 10/2015 | Chow | |
| 2016/0239352 A1 | 8/2016 | Evans | |
| 2016/0255089 A1 | 9/2016 | Diestler et al. | |
| 2017/0093700 A1 | 3/2017 | Gilley et al. | |
| 2018/0157468 A1 | 6/2018 | Stachura | |
| 2018/0197144 A1 | 7/2018 | Frank et al. | |
| 2018/0287982 A1 | 10/2018 | Draeger et al. | |
| 2019/0065258 A1 | 2/2019 | Irudayaraj et al. | |
| 2019/0089705 A1 | 3/2019 | Chud et al. | |
| 2020/0358602 A1 | 11/2020 | Huang et al. | |
| 2020/0382510 A1 | 12/2020 | Dunjic et al. | |
| 2020/0412735 A1 | 12/2020 | Suhail et al. | |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.

"Die, Email, Die! A Flickr Cofounder Aims To Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.

Robert Hof, "Stewart Butterfield On How Slack Became A $2.8 Billion Unicorn", Forbes, [online] [retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.

Internet Relay Chat, Wikipedia, [online][retrieved May 30, 2019]. Retrieved from the Internet: <URL: https://en.wikipedia.org/wiki/Internet_Relay_Chat> (dated May 28, 2019) 21 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516> (dated Oct. 31, 2014) 3 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.

Matsumoto, T. et al., "Chocoa Communicator—A New Communication System Based on Awareness and Text Communications", Fujitsu Sci. Tech. J., 36, 2, (Dec. 2000) pp. 154-161.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

\* cited by examiner

MANAGING ADMIN CONTROLLED ACCESS OF EXTERNAL RESOURCES TO GROUP-BASED COMMUNICATION INTERFACES VIA A GROUP-BASED COMMUNICATION SYSTEM

RELATED APPLICATOINS

This Application claims priority to U.S. patent application Ser. No. 16/456,675, filed Jun. 28, 2019, and issued as U.S. Pat. No. 11,258,800 on Feb. 22, 2022, which is incorporated herein by reference.

TECHNOLOGICAL FIELD

Embodiments of the present disclosure relate generally to token and permission management of external resources accessing various group-based communication interfaces of a group-based communication system and, more particularly, to a systems, methods, and computer program products for managing admin controlled access of external resources to group-based communication interfaces via a group-based communication system.

BACKGROUND

A communication system may manage access of an external resource to various communication interfaces. To access a particular communication interface, external resources may require approval by an administrator user associated with an admin account of the communication interface. However, such an approval process may quickly become overwhelming for an organization associated with tens, hundreds, thousands, or more of communication interfaces, when managed on an individual communication interface level. An external resource may additionally be required to manage significant amounts of authentication information, such as authentication tokens, for accessing various communication interfaces. Applicant has identified a number of deficiencies and problems with managing access of an external resources to one or more communication interfaces via a communication system. Through applied effort, ingenuity, and innovation, many of these identified problems have been solved by developing solutions that are included in embodiments of the present disclosure, many examples of which are described in detail herein.

BRIEF SUMMARY

This disclosure relates to methods, systems, apparatuses, and computer program products for managing admin-controlled access of external resources to group-based communication interfaces via a group-based communication system.

An example embodiment includes a group-based communication system configured for managing admin-controlled access of external resources to group-based communication interfaces via the group-based communication system. The group-based communication system comprises at least one processor and at least one memory. The at least one memory comprises computer-coded instructions therein. The computer-coded instructions are configured to, when executed by the at least one processor, cause the group-based communication system to receive, from a client device, an external resource access request comprising an external resource identifier associated with an external resource and a requested group-based communication interface identifier associated with a requested group-based communication interface, wherein the external resource access request is indicative of a request to enable access to the external resource from within the requested group-based communication interface. The computer-coded instructions are further configured to cause the system to determine an organization identifier associated with the requested group-based communication interface identifier. The computer-coded instructions are further configured to cause the system to transmit an admin approval request to an admin device associated with an admin user account for the organization identifier. The computer-coded instructions are further configured to cause the system to receive an admin response transmission from the admin device, wherein the admin response transmission comprises an admin response indication associated with the requested group-based communication interface and the external resource. The computer-coded instructions are further configured to cause the system to set an external resource permission status for the external resource based on the admin response indication, wherein the external resource permission status is associated with the requested group-based communication interface. The computer-coded instructions are further configured to cause the system to cause rendering, to the client device, of the requested group-based communication interface including an external resource access component configured to access services provided by the external resource from within the requested group-based communication interface.

In some embodiments of the system, where the admin response indication comprises an admin approval, the system is further configured to obtain a multi-interface access token associated with the external resource identifier; generate a single-interface access token for the requested group-based communication interface identifier; and store the single-interface access token associated with the requested group-based communication interface identifier and the multi-interface access token.

In some embodiments of the system, the admin response transmission further comprises an additional admin response indication associated with an additional group-based communication interface associated with the organization identifier, and the system is further configured to set an additional external resource permission status for the external resource based on the additional admin response indication, wherein the additional external resource permission status is associated with the additional group-based communication interface.

In some embodiments of the system, the admin response indication comprises an admin approval, and admin the response transmission further comprises an additional admin approval associated with an organization-linked group-based communication interface associated with the organization identifier, and the system is further configured to obtain a multi-interface access token associated with the external resource; generate a first single-interface access token for the requested group-based communication interface; store the first single-interface access token associated with the requested group-based communication interface and the multi-interface access token; generate an additional single-interface access token for the organization-linked group-based communication interface identifier; and store the additional single-interface access token associated with the organization-linked group-based communication interface and the multi-interface access token.

In some embodiments of the system, the system is further configured to provide, for rendering to the admin device, an administrative management interface associated with the organization identifier, the administrative management interface comprising at least the admin approval request, wherein the computer-coded instructions cause the system to receive the admin response transmission in response to user engagement with the administrative management interface.

In some embodiments of the system, the admin response transmission further comprises an external resource request rule set, and the system is further configured to store the external resource request rule set associated with the organization identifier; receive, from the client device, a second external resource access request comprising a second external resource identifier associated with a second external resource and a second requested group-based communication interface identifier associated with a second requested group-based communication interface, wherein the second external resource access request is indicative of a request to enable access to the second external resource from within the second group-based communication interface; determine the second requested group-based communication interface identifier is associated with the organization identifier; retrieve the external resource request rule set associated with the organization identifier; identify a second request metadata set associated with the second external resource access request; determine the request metadata set satisfies at least an external resource request rule in the external resource request rule set, wherein the determination is associated with a second admin response indication; set a second external resource permission status for the second external resource based on the second admin response indication, wherein the second external resource permission status is associated with the second requested group-based communication interface identifier; and cause rendering, to the client device, of the second requested group-based communication interface including a second external resource access component configured to access services provided by the second external resource from within the second requested group-based communication interface.

In some embodiments of the system, the admin response transmission further comprises an admin preapproval associated with an organization-linked group-based communication interface identifier associated with an organization-linked group-based communication interface, and the system is further configured to set a second external resource permission status for the external resource associated with the organization-linked group-based communication interface identifier to a preapproved status; receive, from the client device, a second external resource access request comprising the external resource identifier associated with the external resource and a second requested group-based communication interface identifier, wherein the second requested group-based communication interface identifier comprises the organization-linked group-based communication identifier associated with the organization-linked group-based communication interface, and wherein the second external resource access request is indicative of a request to enable access to the external resource from within the organization-linked group-based communication interface; determine the second external resource permission status for the external resource associated with the organization-linked group-based communication interface identifier comprises a preapproved status, wherein the determination is associated with an admin approval; set the second external resource permission status for the external resource associated with the organization-linked group-based communication interface to an approved status; and cause rendering, to the client device, of the organization-linked group-based communication interface including a second external resource access component configured to access services provided by the external resource from within the organization-linked group-based communication interface.

In other embodiments, another system is provided for managing admin-controlled access of external resources to group-based communication interfaces via the group-based communication system. The group-based communication system comprises at least one processor and at least one memory. The at least one memory comprises computer-coded instructions therein. The computer-coded instructions are configured to, when executed by the at least one processor, cause the group-based communication system to receive, from a client device, an external resource access request comprising an external resource identifier associated with an external resource and a requested group-based communication interface identifier associated with a requested group-based communication interface, where the external resource access request is indicative of a request to enable access to the external resource from within the requested group-based communication interface. The computer-coded instructions are further configured to cause the system to determine an organization identifier associated with the requested group-based communication interface identifier. The computer-coded instructions are further configured to cause the system to identify an external resource request rule set associated with the organization identifier, the external resource request rule set comprising at least one external resource request rule. The computer-coded instructions are further configured to cause the system to extract a request metadata set associated with the resource access request. The computer-coded instructions are further configured to cause the system to determine the request metadata set satisfies at least one of the at least one external resource request rule of the external resource request rule set, wherein the determination is associated with an admin response indication. The computer-coded instructions are further configured to cause the system to set an external resource permission status for the external resource based on the admin response indication, wherein the external resource permission status is associated with the requested group-based communication interface. The computer-coded instructions are further configured to cause the system to cause rendering, to the client device, of the requested group-based communication interface including an external resource access component configured to access services provided by the external resource from within the requested group-based communication interface.

In some embodiments of the system, the admin response indication comprises an admin approval, and wherein the system is further configured to obtain a multi-interface access token associated with the external resource; generate a single-interface access token for the requested group-based communication interface; and store the single-interface access token associated with the requested group-based communication interface and the multi-interface access token.

Another embodiment system is provided for enabling access of external resources to group-based communication interfaces via the group-based communication system. The group-based communication system comprises at least one processor and at least one memory. The at least one memory comprises computer-coded instructions therein. The computer-coded instructions are configured to, when executed by the at least one processor, cause the group-based communication system to receive, from a client device, an external resource service request including an external resource identifier associated with an external resource and a requested group-based communication interface identifier associated with a requested group-based communication interface. The computer-coded instructions are further configured to cause the system to identify an external resource access token based on the external resource identifier. The computer-coded instructions are further configured to cause the system to transmit a service performance request to the external resource, wherein the service performance request comprises the external resource access token and the requested group-based communication interface identifier. The computer-coded instructions are further configured to cause the system to receive, in response to the service performance request, an interface access request from the external resource, wherein the interface access request comprises at least a multi-interface access token. The computer-coded instructions are further configured to cause the system to retrieve a single-interface access token from a group-based communication repository based on (1) the group-based communication interface identifier and (2) the multi-interface access token. The computer-coded instructions are further configured to cause the system to access, utilizing the single-interface access token, the requested group-based communication interface based on the interface access request.

In some embodiments of the system, the group-based communication system is configured to access the requested group-based communication interface, based on the interface access request, to include an external resource service communication, and the system is further configured to cause rendering, to the client device, of the requested group-based communication interface including the external resource service communication.

In some embodiments of the system, the system is further configured to receive a second external resource service request including the external resource identifier associated with the external resource and a second requested group-based communication interface identifier associated with a second requested group-based communication interface; transmit a second service performance request to the external resource, wherein the second service performance request comprises the external resource access token; receive, in response to the second service performance request, a second interface access request from the external resource, wherein the second interface access request comprises at least the multi-interface access token; retrieve a second single-interface access token from the group-based communication repository based on (1) the second requested group-based communication interface identifier and (2) the multi-interface access token; and access, utilizing the second single-interface access token, the second requested group-based communication interface based on the second interface access request.

In some embodiments of the system, the system is further configured to receive a second external resource service request including a second external resource identifier associated with a second external resource and the requested group-based communication interface identifier associated with the requested group-based communication interface; identify a second external resource access token based on the second external resource identifier; transmit a second service performance request to the second external resource, wherein the second service performance request comprises the external resource access token; receive, in response to the second service performance request, a second interface access request from the external resource, wherein the second interface access request comprises at least a second multi-interface access token; retrieve a second single-interface access token from the group-based communication repository based on (1) the second requested group-based communication interface identifier and (2) the second multi-interface access token; and access, utilizing the second single-interface access token, the second requested group-based communication interface based on the second interface access request.

In some embodiments of the system, the interface access request is associated with a requested access scope, and the group-based communication system is further configured to identify an approved access scope associated with the single-interface access token; and determine the requested access scope satisfies the approved access scope.

BRIEF DESCRIPTION OF THE DRAWINGS

Figure 1:
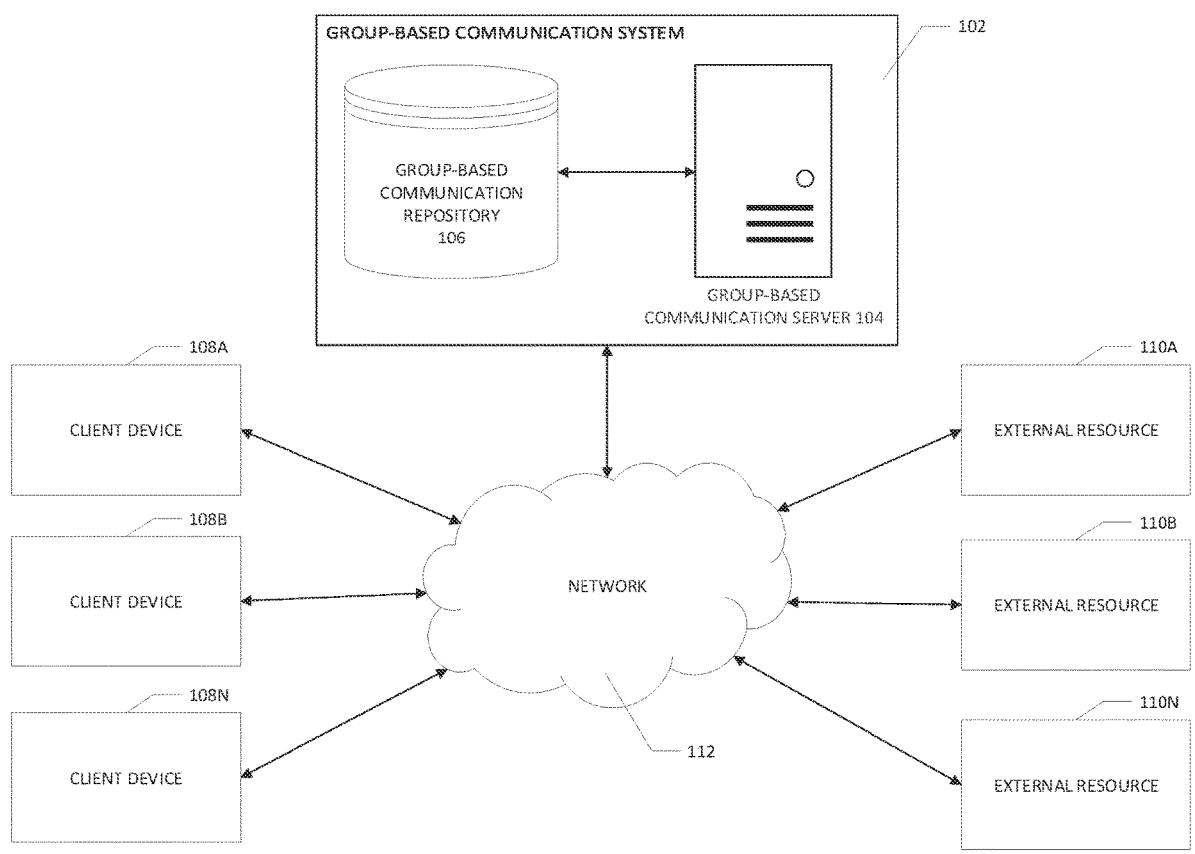
Figure 2:
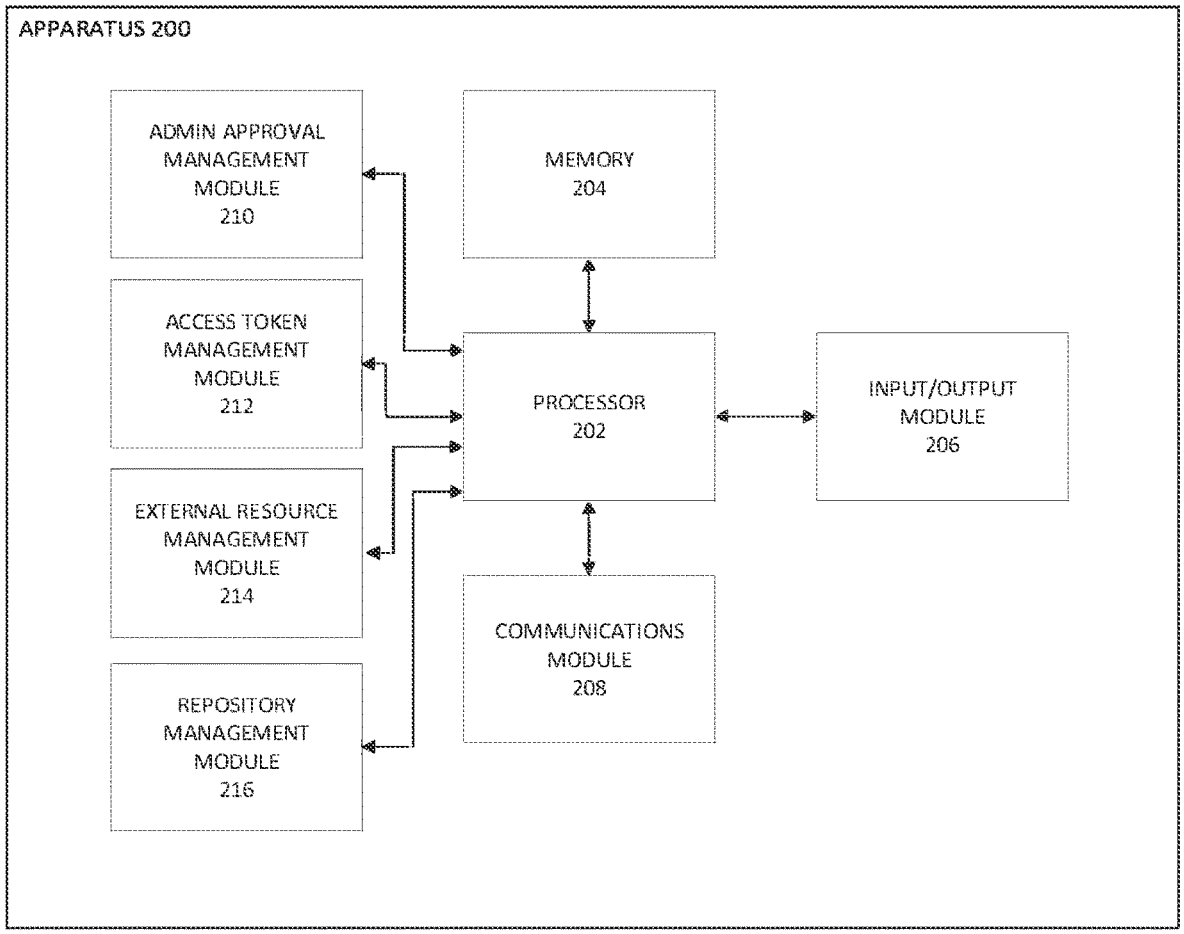
Figure 3A:
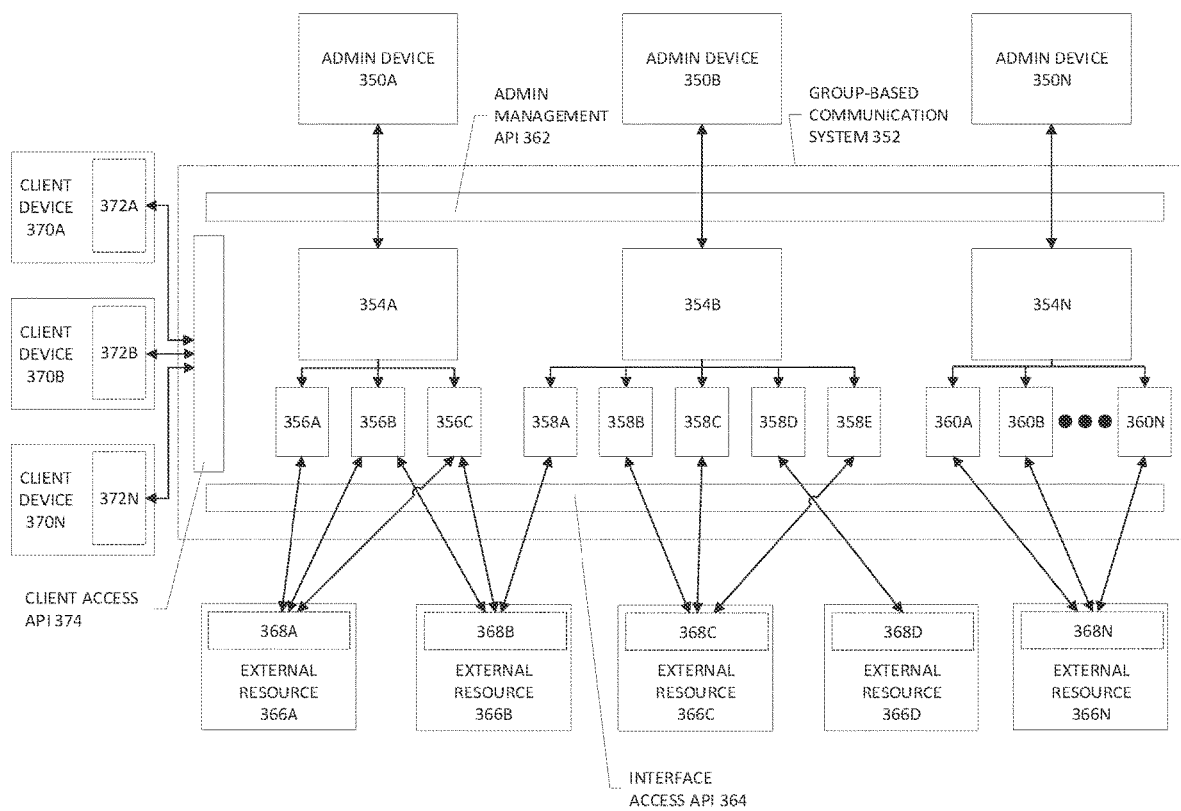
Figure 3B:
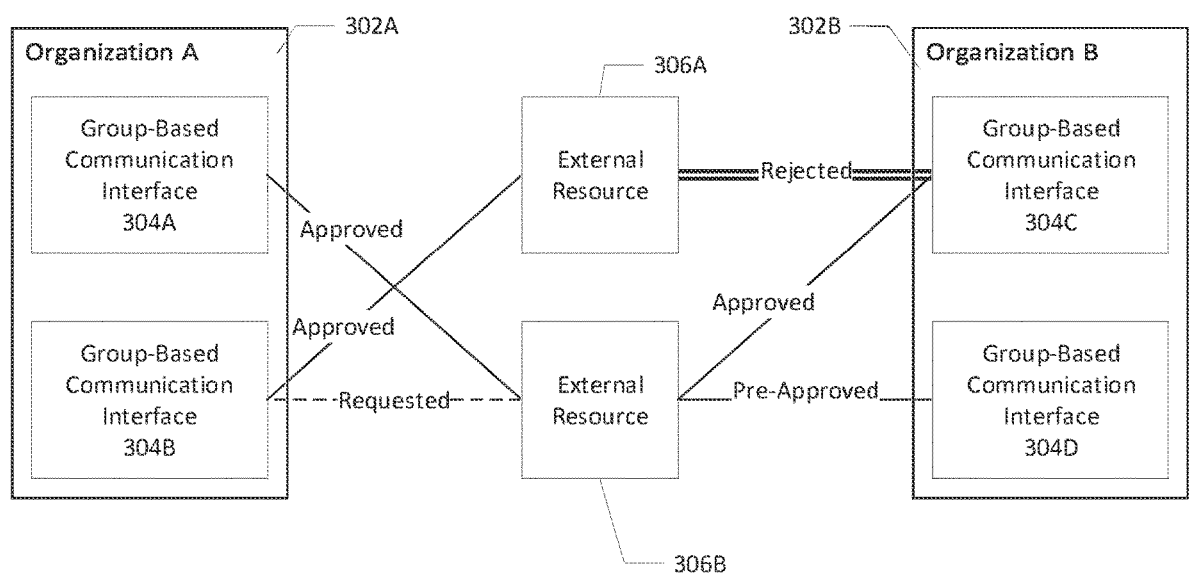
Figure 4:
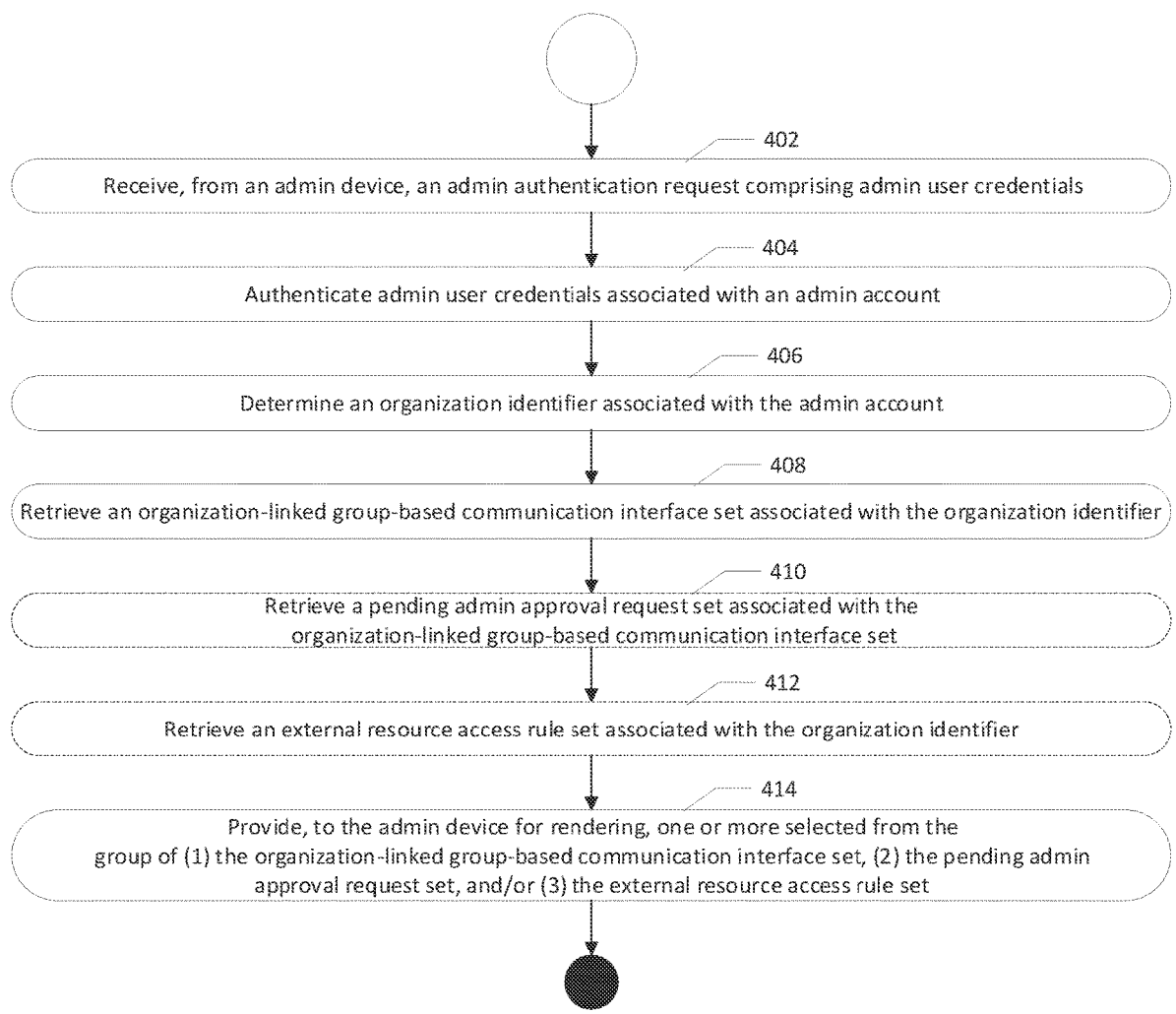
Figure 5:
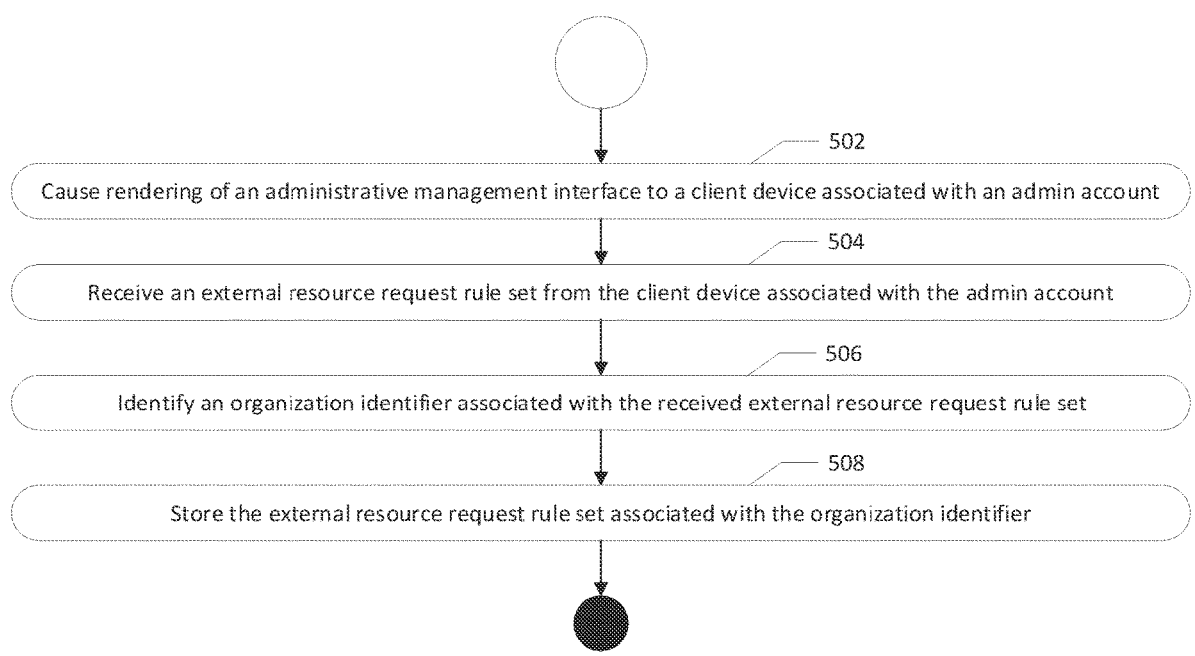
Figure 6:
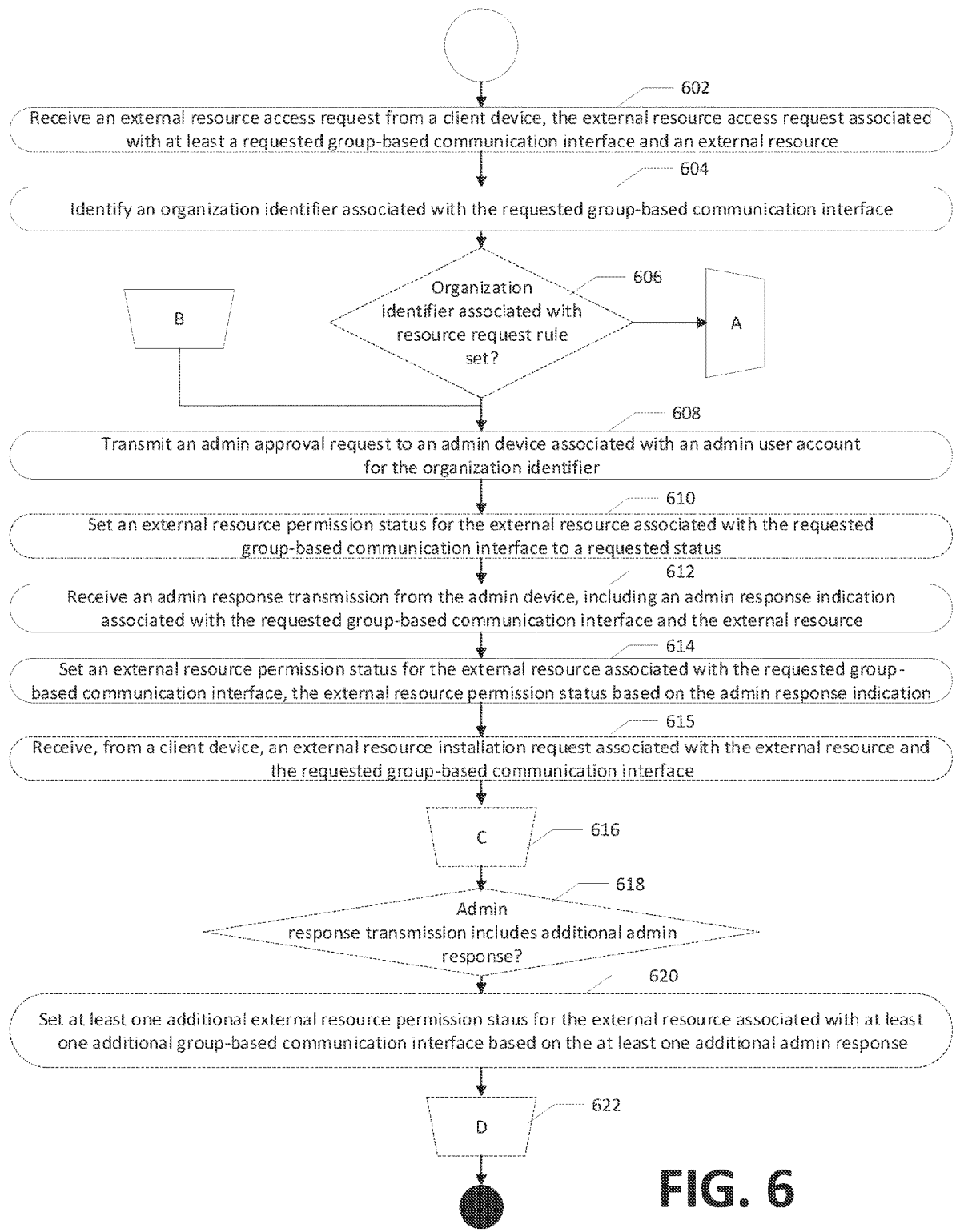
Figure 7:
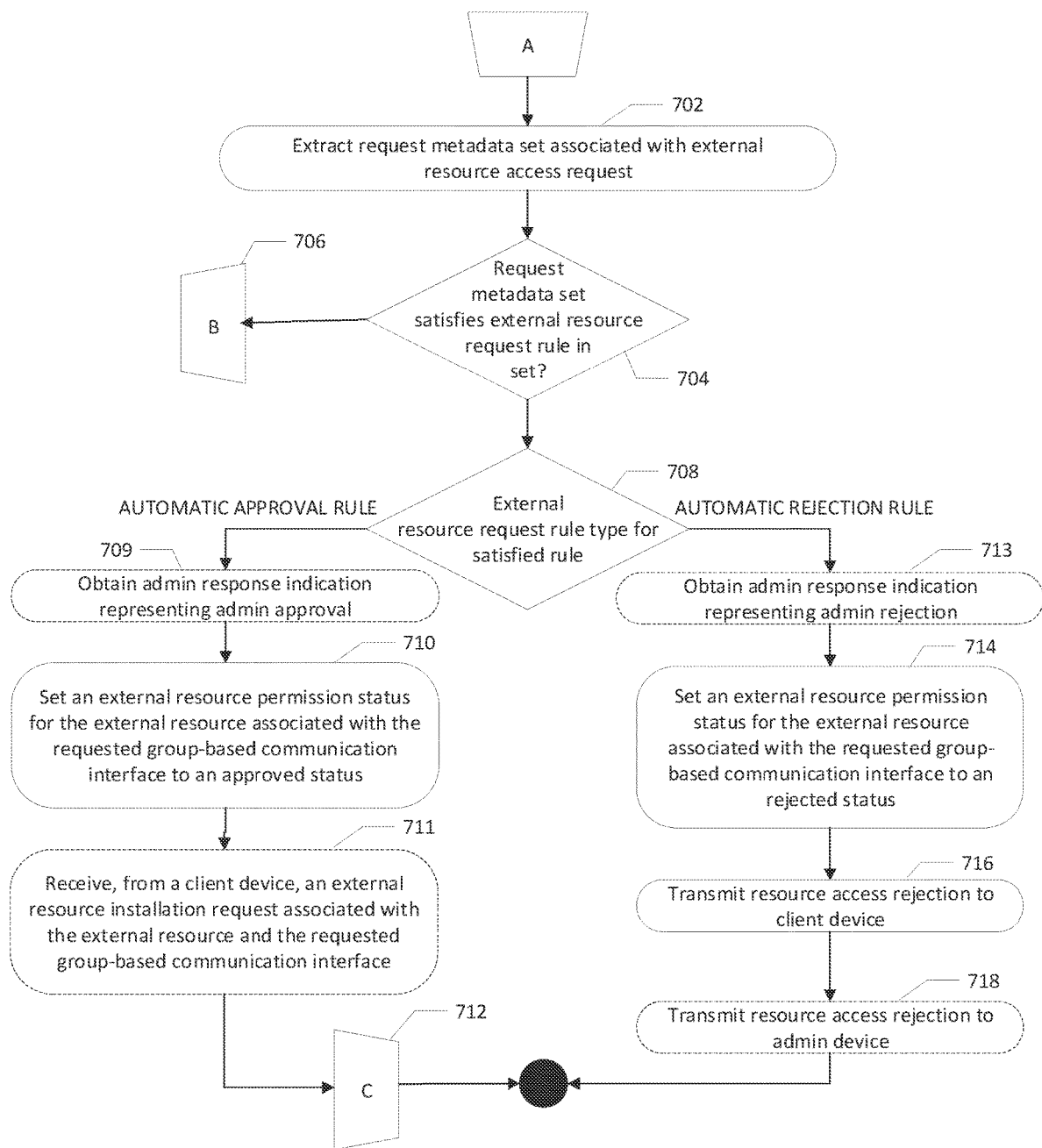
Figure 8A:
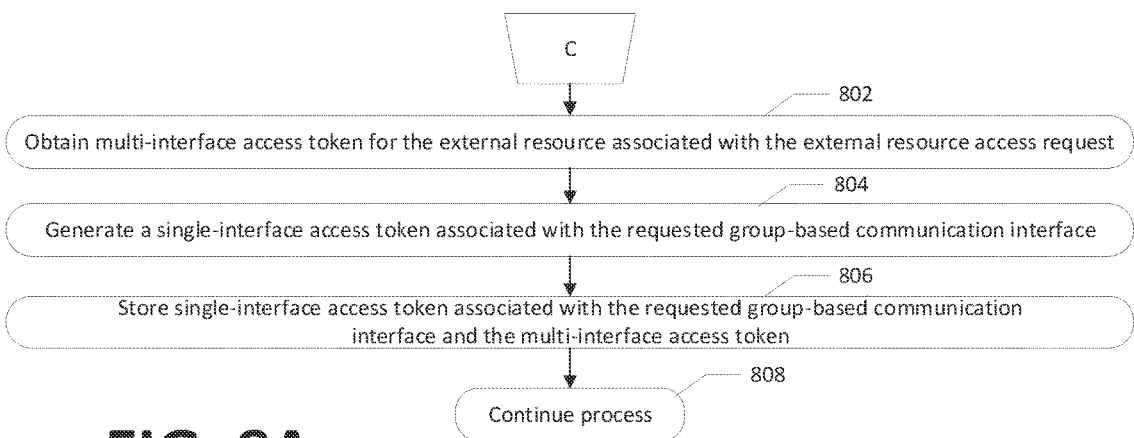
Figure 8B:
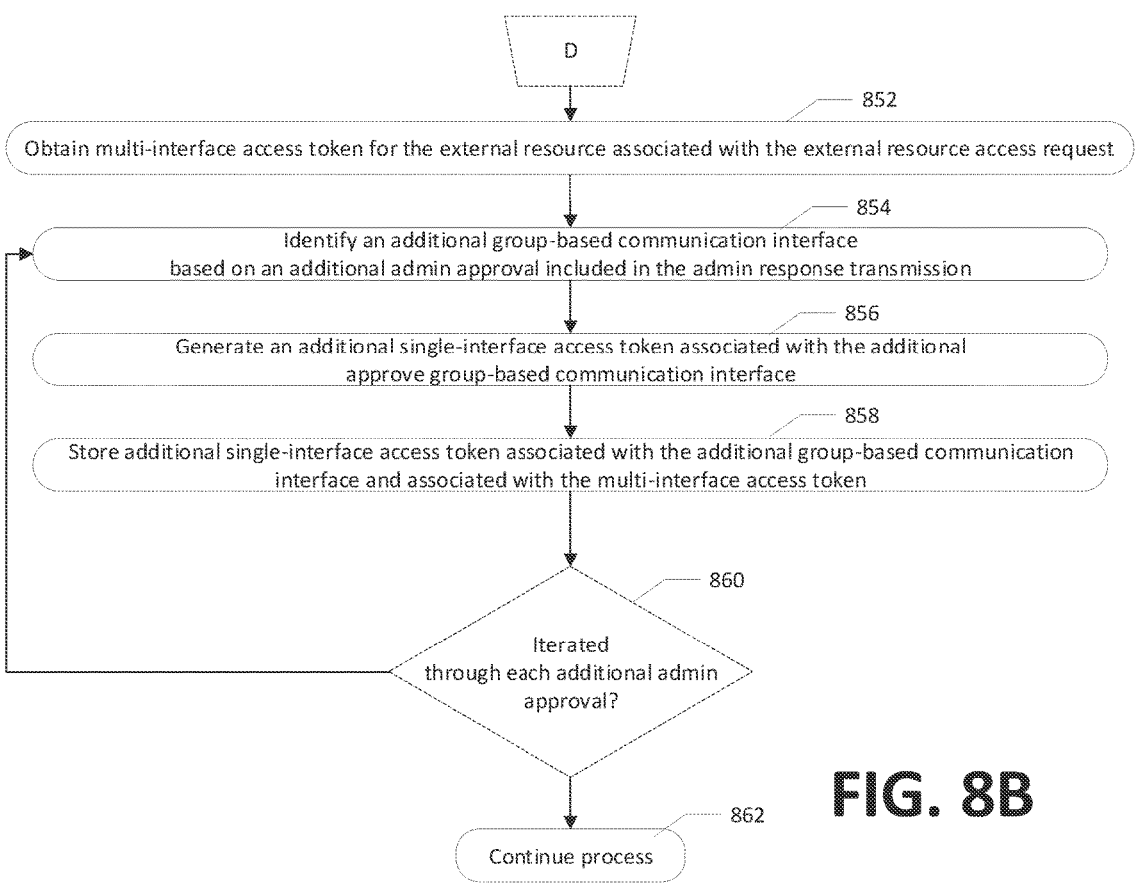
Figure 9:
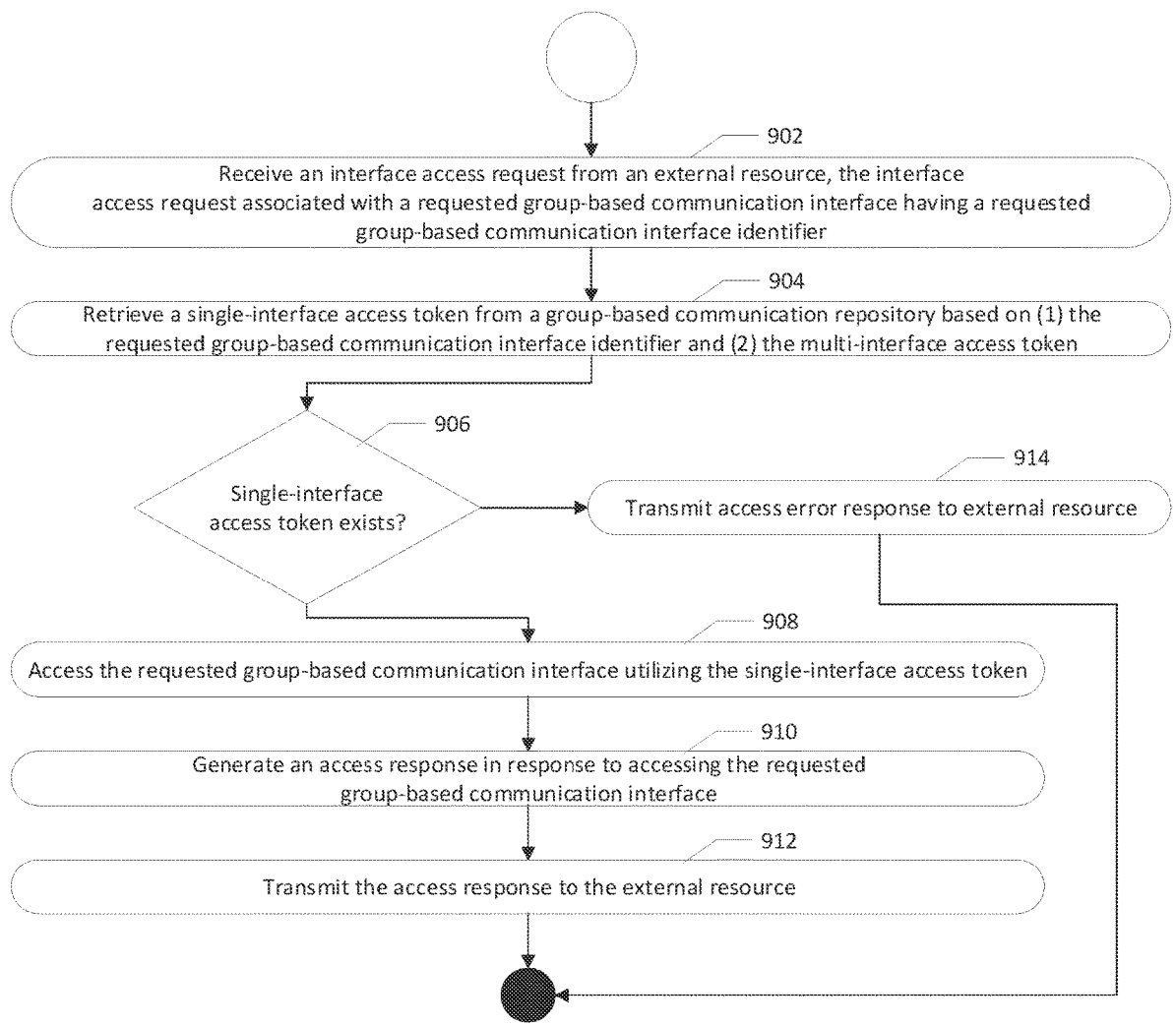
Figure 10A:
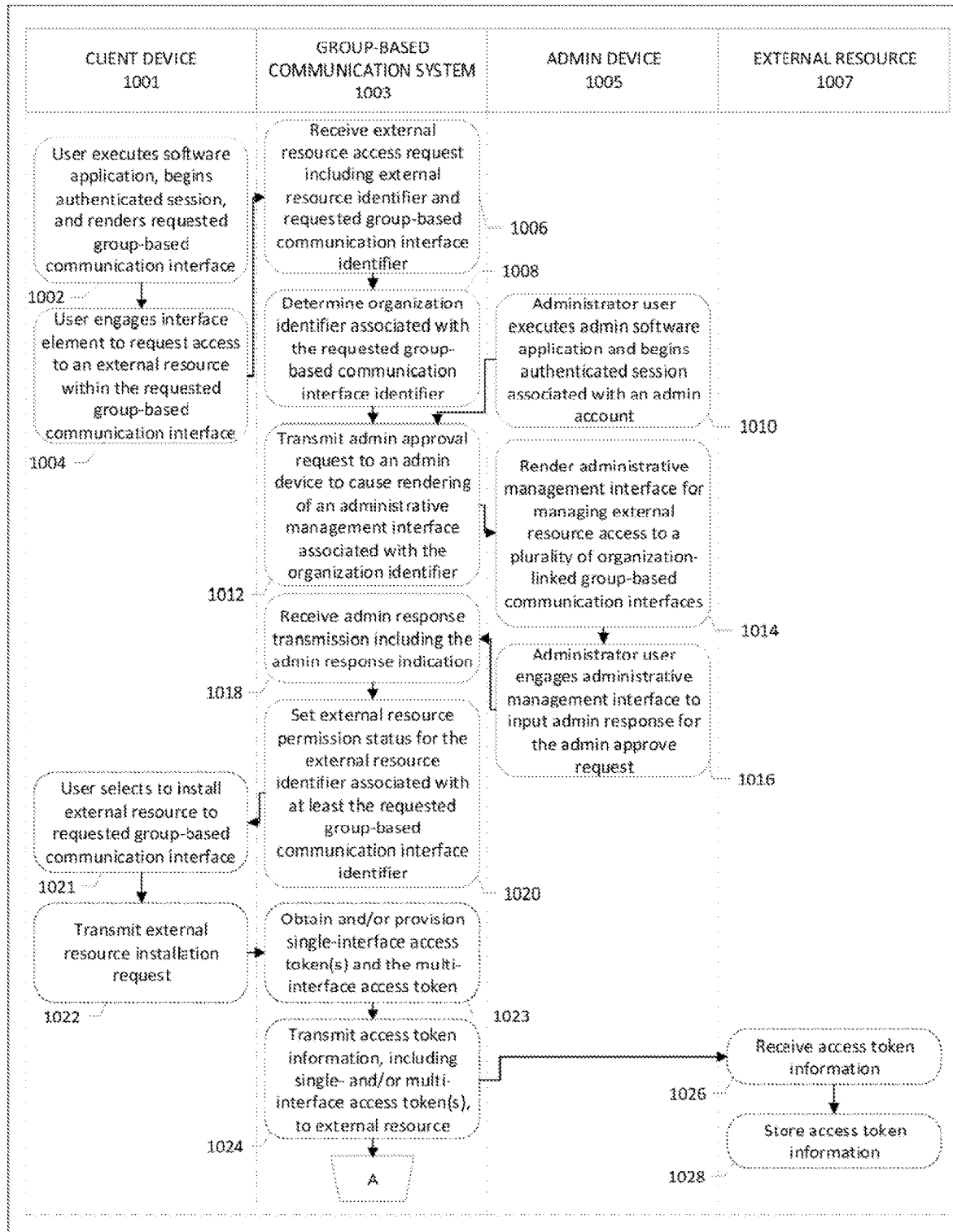
Figure 10B:
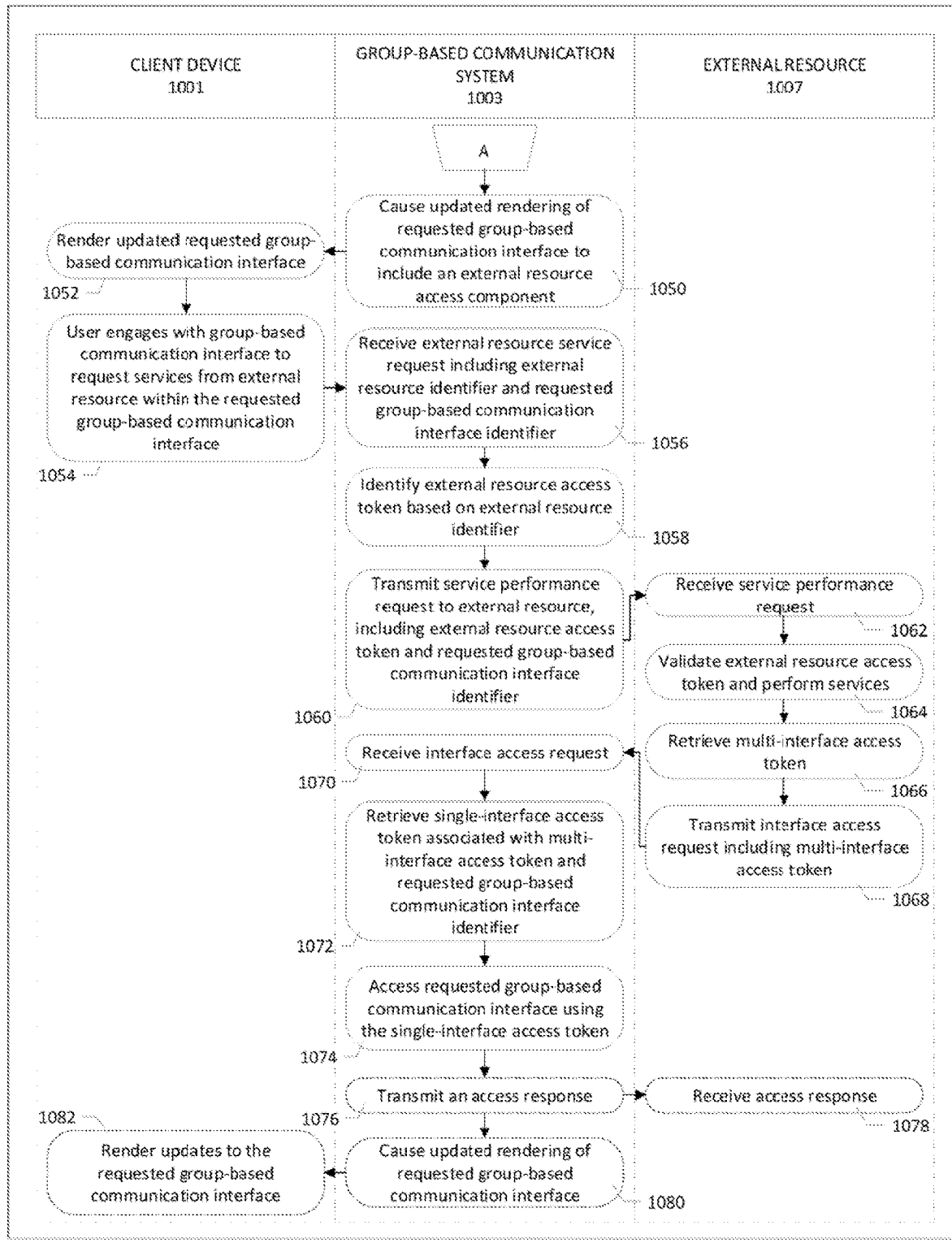

Having thus described certain example embodiments of the present disclosure in general terms, reference will now be made to the accompanying drawings, which are not necessarily drawn to scale, and wherein:

FIG. 1 illustrates an example system diagram, in accordance with some example embodiments of the present disclosure;

FIG. 2 illustrates a schematic block diagram of modules embodying an apparatus, in accordance with some example embodiments of the present disclosure;

FIG. 3A illustrates an example architecture for admin devices, client devices, and external resources configured for accessing a group-based communication system for communication associated with managing and/or accessing one or more group-based communication interfaces associated with one or more organization data objects, in accordance with some example embodiments of the present disclosure;

FIG. 3B illustrates an example architecture for managing admin-controlled access to group-based communication interface(s) by external resource(s), in accordance with some example embodiments of the present disclosure;

FIG. 4 illustrates a flowchart describing example operations for providing organization administrative information to an admin user account associated with an authenticated session executed via a client device, in accordance with some example embodiments of the present disclosure;

FIG. 5 illustrates a flowchart describing example operations for receiving an external resource request rule set for an organization having a particular organization identifier, in accordance with some example embodiments of the present disclosure;

FIG. 6 illustrates a flowchart describing example operations for receiving an external resource access request, requesting and receiving an admin response indication to the request, and configuring the system based on the admin response indication, in accordance with some example embodiments of the present disclosure;

FIG. 7 illustrates a flowchart describing example operations for managing admin approval of a received external resource access request based on an external resource request rule set, in accordance with some example embodiments of the present disclosure;

FIGS. 8A and 8B illustrate flowcharts describing example operations for facilitating access to one or more group-based communication interfaces by generating, configuring, and otherwise managing various access tokens, in accordance with some example embodiments of the present disclosure;

FIG. 9 illustrates a flowchart describing example operations for accessing a group-based communication interface, by an external resource via a group-based communication system, in accordance with example embodiments of the present disclosure; and FIG. 10A illustrates an exemplary data flow diagram depicting operational steps for managing admin-controlled access of external resources to group-based communication interfaces via the group-based communication system, in accordance with example embodiments of the present disclosure; and FIG. 10B illustrates an exemplary data flow diagram depicting operational steps for accessing a group-based communication interface, by an external resource via a group-based communication system, in accordance with example embodiments of the present disclosure.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. Like numbers refer to like elements throughout.

Overview

A group-based communication system may manage a significant number of group-based communication interfaces. Each group-based communication interface may be associated with an organization data object having an organization identifier. Various user accounts may have access to different group-based communication interfaces, and within each group-based communication interface may request that one or more external resources be permissioned and/or provisioned to enable the external resource to access the group-based communication interface, such as to provide functionality.

Users accounts may be associated with one or more organizations data objects. Each organization data object may be created and associated with an organization entity that the user is associated with (e.g., has a business relationship with, or otherwise interacts with). An organization data object may be created after finalization and performance of an offline organization creation process. For example, an executive, administrator, or other member with sufficient permission may contact administrators and/or controllers of a group-based communication system to create a corresponding organization data object for the organization. The organization creation process may further include identifying one or more user accounts for associating with the newly created organization, for example by assigning a user role associated with the organization identifier (e.g., such that a user account may be permissioned as an administrator for an organization data object associated with the organization identifier). Additionally, the organization creation process may include identifying one or more existing group-based communication interfaces, and linking the group-based communication interfaces with the organization data object, for example by associating the group-based communication interfaces with the organization identifier. Upon creation of the organization data object, users associated with admin accounts associated with the organization identifier, may create new organization-linked group-based communication interfaces via the group-based communication system.

An organization identifier may be associated with hundreds, thousands, or even more group-based communication interfaces, each accessible to different groups of user accounts associated with the organization identifier. Furthermore, the users within each group-based communication interface may desire to permission and/or provision various external resources to access functionality associated with the external resource.

An organization associated with an organization data object may desire to protect the information accessible within the various group-based communication interfaces. To ensure that only vetted and secure external resources are permissions/provisioned, such as those external resources that request access to scopes meeting the organization's data security requirements, adding a new external resource to a group-based communication interface may require admin approval by an administrator associated with an admin account.

However, because external resources may be permissioned and/or provisioned at the group-based communication interface level (e.g., each external resource requires individual admin approval to be added to each group-based communication interface) facilitating such admin approval can quickly become overwhelming. For example, for an organization data object associated with hundreds of group-based communication interfaces, if a particular external resource was to be added to each of the group-based communication interfaces, doing so manually would require receiving a request for each external resource, and subsequently receiving approval by an admin, for each group-based communication interface. This admin may be a single-admin permissioned as an administrator for a plurality of group-based communication interfaces, or a plurality of admins for the various group-based communication interfaces. Enabling administrators to receive external resource access requests, approve or reject the external resource access request, approve or reject the external resource for access to one or more other group-based communication interfaces associated with a shared organization identifier, and/or create an external resource request rule set for automatically approving and/or rejecting external resource access requests, conserves computing resources and enables management of such a large amount of group-based communication interfaces that would not otherwise be feasible.

Furthermore, external resources may access a group-based communication interface using an authentication token. During a permissioning and provisioning process, a group-based communication system may generate an authentication token enabling the external resource to access the group-based communication interface. An authentication token may enable access only to a particular group-based communication interface. Thus, to access and provide services to a plurality of group-based communication interfaces (e.g., hundreds, thousands, or more) the external resource may be expected to manage hundreds an authentication token for each group-based communication interface.

In this regard, various embodiments of the present disclosure relate to managing admin-controlled access of external resources to group-based communication interfaces via a group-based communication system. Embodiments specifically relate to enabling permissioning and/or provisioning and/or management of multiple group-based communication interfaces, each associated with a common organization identifier. Additionally or alternatively, embodiments relate to managing admin-controlled access of external resources to group-based communication interfaces using an administrative management interface.

Embodiments improve the efficiency of admin-controlled access of external resources. In some embodiments, a group-based communication system may be configured to manage an admin management API configured to receive external resource access requests, provide corresponding admin approval requests to one or more admin devices, and receive admin responses. An administrative management interface may enable an administrator associated with an admin account to view and approve and/or reject requested external resource access requests, and approve and/or reject external resource access to various group-based communication interfaces rather than at a group-based communication interface level. Additionally or alternatively, an administrative management interface may enable creation of external resource request rules to enable automatic approval and/or rejection of future external resource requests. An external resource request rule set enables automatic processing of incoming external resource access requests.

Embodiments of the present disclosure further enable efficient storage of access tokens to decrease storage requirements for external resources and increase overall system security. In this regard, embodiment systems may facilitate external resource access to group-based communication interfaces using a multi-interface access token and various single-interface access tokens. A group-based communication system may generate and maintain a mapping between the multi-interface access token and the various single-interface access tokens for a given external resource. Accordingly, the external resource may only store and securely maintain the multi-interface access token instead of a plurality of access tokens. Such embodiments improve the hardware storage requirements associated with external resources, which may be limited compared to the storage capacities of the group-based communication system. Additionally or alternatively, such embodiments improve system security by lowering the change that the external resource will have an access token compromised. The various embodiments utilize a custom solution, and may utilize an application programming interface configured to require the multi-interface access token and additional information (e.g., a requested group-based communication interface identifier associated with a group-based communication requested to be accessed), thus providing a technical solution to the technical problem of data access.

Definitions

The term "or" is used herein in both the alternative and conjunctive sense, unless otherwise indicated.

The terms "illustrative" and "exemplary" are used with respect to non-limiting examples with no indication of quality level.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "obtain" refers to an action to identify, determine, generate, construct, initialize, or receive an electronically managed data object. In some embodiments, "obtain" refers to retrieving a data object from a local or remote repository. In other embodiments, "obtain" refers to generating a data object.

"Group-based" is used herein to refer to a system, channel, message, or virtual environment that has security sufficient such that the system, channel, message, or virtual environment is accessible only to a defined group of users (e.g., users having a common group-based communication interface identifier associated with their respective user profiles). The group may be defined by common access credentials such as those of an organization or commercial enterprise. Access may further be facilitated by a validated request to join or an invitation to join transmitted by one group member user to another non-member user. Group-based communication interface identifiers (defined below) are used to associate data, information, messages, etc., with specific groups.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective group-based communication interface. For example, the group-based communication system might support, among others, a Slack Corporation group-based communication interface and an ACME Corporation group-based communication interface. Example group-based communication systems comprise supporting servers and client devices, and are further configured to engage external resources and validated external resources as defined below.

The term "group-based communication server" refers to a software platform and associated hardware that is configured to manage access to the various group-based communication interfaces (defined below) of the group-based communication system. The group-based communication server is configured to access, maintain, and support application product logic of the group-based communication system and to access one or more data repositories such as a group-based communication repository and a user identification repository.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees however the ACME Corporation group-based communication interface would not be accessible and viewable to Slack employees). The group-based communication interface comprises a plurality of group-based communication channels (e.g., a marketing channel, sales channel, accounting channel, etc.), which are defined below.

The term "group-based communication channel" refers to a virtual communications environment or feed that is configured to display messaging communications posted by channel members (e.g., validated users accessing the environment using client devices) that are viewable only to the members of the group. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel.

The term "group-based communication interface identifier" refer to one or more items of data by which a group-based communication interface within a group-based communication system may be uniquely identified. For example, a group-based communication interface identifier may comprise ASCII text, a pointer, a memory address, and the like. In one embodiment, the group-based communication interface identifier associated with member users of a Slack Corporation workspace (i.e., a group-based communication interface) is 104356721.

Group-based communication system users are organized into organization groups (e.g., employees of each company may be a separate organization group), which may have one or more sub-groups within each organization group. Each sub-group may be associated with a particular group-based communication interface for facilitating communication between the members of the sub-group (which may include guest users and other members from outside the group or sub-group as well). Each group-based communication interface may have one or more group-based communication channels to which users may be assigned or which the users may join (e.g., group-based communication channels may represent departments, geographic locations such as offices, product lines, user interests, topics, issues, and/or the like). A group-based communication interface identifier is used to facilitate access control for a message (e.g., access to the message, such as having the message return as part of search results in response to a search query, may be restricted to those users having access to the group-based communication interface, such as by having the group-based communication interface identifier associated with their user profile). The group-based communication interface identifier may be used to determine context for the message (e.g., a description of the group, such as the name of an organization or sub-group of an organization, and/or a brief description of the organization or sub-group of an organization, may be associated with the group-based communication interface identifier).

Group-based communication system users may join group-based communication channels. Some group-based communication channels may be globally accessible to those users having a particular organizational group-based communication interface identifier associated with their user profile (i.e., users who are members of the organization). Access to some group-based communication channels may be restricted to members of specified groups, whereby the group-based communication channels are accessible to those users having a particular group-based communication interface identifier associated with their user profile. The group-based communication channel identifier may be used to facilitate access control for a message (e.g., access to the message, such as having the message return as part of search results in response to a search query, may be restricted to those users having the group-based communication channel identifier associated with their user profile, or who have the ability to join the group-based communication channel). The group-based communication channel identifier may be used to determine context for the message (e.g., a description of the group-based communication channel, such as a description of a project discussed in the group-based communication channel, may be associated with the group-based communication channel identifier).

The term "group-based communication" refers to an electronically generated and maintained digital content object provided by a user associated with a user account, via a client device. A group-based communication is configured for display within a group-based communication channel. A group-based communication may include any text, image, video, audio, or a combination thereof provided by a user, via a client device. For instance, the user may provide a group-based communication that includes text as well as an image and a video within a contents portion of the group-based communication. A group-based communication includes data, and/or metadata, for identification, display, and access of the contents via the corresponding group-based communication channel. For example, in some embodiments, without limitation, the group-based communication includes metadata comprising a communication identifier, a sending user account identifier, a group-based communication interface identifier, a group-based communication channel identifier, and/or a contents portion. In some embodiments, a group-based communication is originated from a client device.

The term "external resource service communication" refers to a particular group-based communication associated with a group-based communication interface and created in response to access of the group-based communication interface by a particular external resource. An external resource service communication summarizes services performed by an external resource and provides information and/or an interface for interacting with the external resource and/or data associated with the services performed. As a non-limiting example, in some embodiments, an external resource service communication is specially configured to include one or more components for rendering and/or interacting with information, documents, data objects, or the like associated with or retrieved from the external resource. In some embodiments, an external resource service communication is associated with a group-based communication channel accessible to the external resource for posting external resource service communication, which may be a specific group-based communication channel dedicated to external resource service communications from the external resource. In some embodiments, external resource service communication is associated with a particular external resource identifier for the external resource for which the external resource service communication originated.

The term "organization data object" refers to one or more data structures by which a set of group-based communication interfaces associated with a particular organization entity may be uniquely identified. The term "organization identifier" refers to one or more items of data by which an organization data object may be uniquely identified. For example, an organization identifier may comprise American Standard Code for Information Interchange (ASCII) text, a pointer, a memory address, a unique numerical and/or string value, and the like.

The term "organization-linked group-based communication interface" refers to one or more group-based communication interfaces each associated with a shared organization identifier. In some embodiments, a particular organization data object may be associated with dozens or even hundreds or more organization-linked group-based communication interfaces.

The term "organization administrative information" refers to information managed by the group-based communication system and associated with a particular organization identifier. Organization administrative information includes, but is not limited to: organization-linked group-based communication interfaces associated with the organization identifier, pending external resource access requests associated with any of the organization-linked group-based communication interfaces associated with the organization identifier, currently approved and rejected external resources associated with any of the organization-linked group-based communication interfaces associated with the organization identifier, and admin accounts associated with the organization identifier.

The term "user" refers to an individual, group of individuals, business, organization, and the like. Users referred to herein are discussed largely in connection with client device enabled activity for accessing a group-based communication interface (or set of group-based communication interfaces) of a group-based communication system. A user may be associated with one or more user accounts, as defined herein.

The terms "user profile," "user account," and "user account details" refer to data, files, and other information associated with a user, including, for example, a user identifier, one or more group-based communication channel identifiers (defined below) associated with group-based communication channels that the user has been granted access to, one or more group-based communication interface identifiers for group-based communication interfaces which the user is associated (e.g., permissioned to access), an indication as to whether the user is an owner of any group-based communication interfaces, an indication as to whether the user has any group-based communication channel restrictions, a plurality of messages, a plurality of emojis, a plurality of conversations, a plurality of conversation topics, a graphical representation, an email address, a real name (e.g., John Doe), a username (e.g., jdoe), a password, a time zone, an external resource user identifier, avatar rendering settings, and the like. The user account details can include a subset designation of user authentication credentials, such as, for example, login information for the user including the user's username and password.

The term "admin account" refers to a particular user account configured associated with administrative permissions for managing a particular group-based communication interface or a particular set of organization-linked group-based communication interfaces for a particular organization identifier. In some embodiments, an admin account is associated with an organization identifier for which the admin account has administrative permissions. An admin account is associated with "admin authentication credentials," "admin user credentials," or "admin details," which are user account credentials specifically associated with a corresponding admin account, for executing an authenticated session on an admin device. In some embodiments, a user account may be permissioned and/or otherwise designated an admin account via assigning one or more user roles associated to the user account.

The term "user authentication request" refers to an information transmission received from a client device by the group-based communication system for authenticating, by the group-based communication system, user account credentials. In some embodiments, a user authentication request is transmitted by a client device and includes user authentication credentials, such as a username and password, for authenticating the user of the client device and executing an authenticated session associated with a corresponding user account. In some embodiments, a group-based communication system receives a user authentication request from a client device via a client access API managed by the group-based communication system.

The term "admin authentication request" refers to an information transmission received from an admin device by the group-based communication system for authenticating, by the group-based communication system, admin credentials. In some embodiments, an admin authentication request is transmitted by an admin device and includes the admin credentials, such as a username and password, for authenticating the administrator user of the admin device and executing an authenticated session associated with a corresponding admin account. In some embodiments, a group-based communication system receives an admin authentication request from an admin device via an approval management API managed by the group-based communication system.

The term "client device" refers to computer hardware and/or software that is configured to access a service made available by a server, such as a group-based communication server of a group-based communication system. The server is often (but not always) on another computer system, in which case the client device accesses the service by way of a network. Client devices may include, without limitation, smart phones, tablet computers, laptop computers, wearables, personal computers, enterprise computers, and the like. Client devices may be associated with a user. The association may be created by the client device transmitting registration information for user to the group-based communication server. In some instances, a client device may be temporarily associated with a user and/or user account (e.g., only when a user is logged onto the group-based communication system app). In such instances, a user may login via a client device to execute an authenticated session via the client device and associated with a particular user account.

The term "admin device" refers to a client device being accessed by an administrator user for executing an authenticated session associated with an admin account, as defined herein. The admin device may be associated with the admin account the administrator user authenticated only during the authenticated session.

The term "external resource" refers to a software program, application, platform, or service that is configured to communicate with the group-based communication system for providing an external service (i.e., not native to the group-based communication system) to a client device via a group-based communication interface.

The term "scope" refers to a defined set of information types and/or data accessible to an external resource. A scope is associated with a "scope identifier" that uniquely represents the scope. In some embodiments, a scope identifier is received as part of an external resource access request for identifying the set of information types and/or data requested to be accessed by an external resource with respect to a particular group-based communication interface.

The term "admin controlled access," with respect to an external resource, refers to a permissioning procedure for approving external resource access to one or more group-based communication interfaces associated with a particular organization identifier. An organization having a particular organization identifier may require admin approval through procedures described herein to enable installation of one or more external resource(s) and/or access by such one or more external resource(s).

The term "external resource permission status" refers to a string, identifier, and/or other indicator that represents whether a user has requested adding an external resource to a group-based communication interface, and/or whether an administrator has approved/rejected the request via an admin response. In some embodiments, an external resource permission status falls within a set of predefined statuses, such as an approved status, a rejected status, and a requested status. In other embodiments, additional or alternative statuses may be provided for (e.g., a pre-approved status).

The term "external resource access record" refers to a data record stored in a repository associated with a group-based communication system that includes an external resource permission status associated with a particular group-based communication interface identifier and external resource identifier. In some embodiments, an external resource access record is updated to change an external resource permission status as an admin response is requested and received. In some embodiments, an external resource access request further includes a single-interface access token for accessing the group-based communication interface associated with the group-based communication identifier stored in the external resource access record.

The term "external resource access request" refers to a data object transmitted from a client device to a group-based communication system, wherein the data object represents a request from a user account to permission an external resource for access to a group-based communication interface. In some embodiments, an external resource access request includes at least an external resource identifier associated with the external resource, and a requested group-based communication interface identifier associated with a group-based communication interface. An external resource access request may be automatically resolved based on an external resource access request rule set. Alternatively, an external resource access request may be resolved via an admin response provided by an administrator via an admin account.

In some embodiments, the external resource access request includes a "request metadata set." The term "request metadata set" refers to metadata and/or other information associated with the external resource access request. For example, a request metadata set may include one or more selected from the group of a user account identifier associated with the user account that made the request, scope identifiers requested to be accessible by the external resource (for example, indicating what data may be accessed by the external resource), external resource description information, developer information associated with the developer of the external resource (for example, a developer identifier), historical information regarding the developer (such as reviews, other external resources associated with the developer, and the like), and an internal developer indicator (such as a bit flag indicating whether the external resource is associated with a developer account associated with the organization identifier and/or group-based communication system). Additionally or alternatively, in some embodiments, a request metadata set includes an external resource identifier for an external resource and/or a group-based communication interface identifier for a requested group-based communication interface.

The term "admin approval request" refers to a data object transmitted from a group-based communication system to an admin device associated with an admin account requesting approval or rejection of a corresponding external resource access request. In some embodiments, an admin approval request is transmitted to an admin device and rendered with associated interface components for approving and rejecting the admin approval request via an administrative management interface.

The term "admin response transmission" refers to a data object transmitted from an admin device to a group-based communication system in response to an admin approval request. An admin response transaction includes at least an "admin response indication," which indicates whether an administrator approved or rejected the associated external resource access request. In some embodiments, an admin response transmission is transmitted by an admin device in response to user engagement by an administrator with an interface component for approving and/or rejecting an admin approval request rendered via an administrative management interface.

The term "external resource installation request" refers to a data object transmitted from a client device to a group-based communication system, where the data object represents a request from a user account to install and/or provision an external resource to a group-based communication interface that an administrator has approved and/or pre-approved. Installing and/or provisioning the external resource enables the external resource to access the group-based communication interface and/or enables accessing of services associated with the external resource via the group-based communication interface. In some embodiments, an external resource installation request includes at least an external resource identifier associated with the external resource to be installed, and a requested group-based communication interface identifier associated with a requested group-based communication interface to which the external resource is to be installed. In some embodiments, an external resource installation request includes information configured to initiate an installation and/or provisioning process via the group-based communication system.

The term "external resource request rule" refers to an admin created algorithm, information check, or procedure for making an automatic determination in response to an external resource access request. In some embodiments, an external resource request rule is based on a request metadata set, or one or more values therein. An external resource request rule is associated with an "external resource request rule type" that represents a procedure and/or permission status that should be applied to the external resource should the external resource request rule be satisfied.

For example, the term "automatic approval rule" refers to a particular external resource request rule type, such that if an external resource access request satisfies an automatic approval rules, the external resource access request should be approved and the permission status for the external resource associated with the requested group-based communication interface should be set to an approved status.

In another example, the term "automatic rejection rule" refers to another particular external resource request rule type, such that if an external resource access request satisfies an automatic rejection rule, the external resource access request should be rejected and the permission status for the external resource associated with the requested group-based communication interface should be set to a rejected status The term "external resource request rule set" refers to an admin created set of one or more external resource request rules for a particular organization identifier. In some embodiments, a group-based communication system may determine an organization identifier associated with the requested group-based communication interface of a newly received external resource access request. The group-based communication system may then utilize an external resource request rule set associated with the organization identifier to determine if the external resource access request satisfies any external resource request rule, and can be automatically approved or rejected.

The term "administrative management interface" refers to a computer-managed device, program, component, or a combination thereof, to interact, via an admin device, with a group-based communication system, via an admin management API and/or one or more associated APIs, for management of an organization data object, and/or organization-linked communication interfaces associated with the organization identifier for the organization data object. In some embodiments, an administrative management interface may comprise one or more software modules configured to communicate with a group-based communication system, or an admin management API therein. In some embodiments, an administrative management interface is rendered to an admin device, and is configured to receive engagement by an administrator and, in response, transmit one or more data transmissions, requests, or the like to a group-based communication system. Non-limiting examples of an administrative management interface include, but are not limited to, a command line interface, a physical interface for communicating with a group-based communication system via one or more APIs, an application interface, a browser interface, another graphical user interface, an API-communication interface, or other renderable information caused to be rendered, for example to a display of an admin device, by a group-based communication system. In some embodiments, an administrative management interface includes organization administrative information associated with one or more organization identifiers. An administrator may utilize an administrative management interface to approve and/or reject pending external resource access requests, edit an external resource request rule set, and/or view group-based communication interfaces associated with the organization identifier(s) and the approved external resources associated with each group-based communication interface. In some embodiments, an administrative management interface is configured to enable approving, pre-approving, or rejection of the external resource for accessing one or more additional group-based communication interfaces when approving and/or rejecting a pending external resource access request. In some embodiments, an administrative management interface is configured to communicate with an admin management API of a group-based communication system.

The term "interface access request" refers to a request transmitted from an external resource to a group-based communication system to access a requested group-based communication interface. In some embodiments, an interface access requests represents a request to store and/or post information to the requested group-based communication interface. In other embodiments, an interface access request represents a request for information associated with the requested group-based communication interface. An interface access request includes at least a requested group-based communication interface identifier and an authentication token (e.g., a single-interface access token or a multi-interface access token).

The term "access response" refers to an electronic data transmission including information associated with accessing of a group-based communication interface on behalf of an external resource. In some embodiments, an access response includes data and/or information retrieved associated with a group-based communication interface (e.g., data retrieved from a group-based communication repository). In some embodiments, an access response includes summary information regarding data stored associated with an access group-based communication interface.

The term "single-interface access token" refers to an electronic data object configured to enable access for a particular external resource to a particular group-based communication interface. A group-based communication system may require a valid single-interface access token to enable an external resource to access information associated with a group-based communication interface. In some embodiments, a single-interface access token is stored by a group-based communication system associated with a multi-interface access token and a particular group-based communication interface identifier for which the single-interface access token is permissioned to access. A single-interface access token is configured according to one or more scopes approved for access.

The term "multi-interface access token" refers to an electronic data object configured for storage by an external resource, and that is associated with one or more single-interface access tokens. In some embodiments, a multi-interface access token is associated with various single-interface access tokens such that each single-interface access token may be retrieved using (1) the multi-interface access token and (2) a group-based communication interface identifier that the single-interface access token may be utilized to access. In some embodiments, an external resource manages a multi-interface access token, and utilizes the multi-interface access token to perform interface access requests via an interface access API managed by a group-based communication system.

The term "external resource service request" refers to data and/or information, transmitted from a client device to a group-based communication system, indicating a user request for services to be provided, via a particular group-based communication interface, by an external resource approved for accessing the particular group-based communication interface. An external resource service request includes at least an external resource identifier and a requested group-based communication interface identifier. In some embodiments, the external resource service request includes a user identifier associated with the user account that made the request. In some embodiments, the external resource service request includes a service identifier that uniquely identifies a particular service the user requests be provided.

The term "external resource access component" refers to a subcomponent of a group-based communication interface for requesting services, via the group-based communication interface, from an external resource approved to access the group-based communication interface. In some embodiments, a group-based communication interface includes an external resource access component for each external resource permissioned and provisioned associated with the group-based communication interface (e.g., having an approved status).

The term "services indicator" refers to an identifier that uniquely indicates a particular type of service requested from an external resource. An external resource may be configured to perform various services, such that each may be associated with a different services indicator. For example, if the external resource is a document management resource, the external resource may be associated with a first services indicator associated with adding a new document, a second services indicator associated with deleting an existing document, a third services indicator associated with sending an existing document to another user, and the like.

System Architecture and Example Apparatus

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, or a computer workstation. Further, an example embodiment may be embodied by any of a variety of mobile terminals, such as a portable digital assistant (PDA), mobile telephone, smartphone, laptop computer, tablet computer, wearable device, or any combination of the aforementioned devices.

In this regard, FIG. 1 discloses an example computing system within which embodiments of the present disclosure may operate. FIG. 1 illustrates an overview for a system configured for managing one or more group-based communication interfaces, and for performing some or all of the various operations and processes described herein.

The system includes a group-based communication system 102, and various client devices 108A-108N (referred to as "client devices 108") and external resources 110A-110N (referred to as "external resources 110"). The group-based communication system 102 may communicate with the client devices 108 and external resources 110 via a network, such as network 112. In some embodiments, the group-based communication system 102 communicates with the client devices 108 and the external resources 110 via the same network. In other embodiments, the group-based communication system 102 communicates with the some of the client devices 108/and external resources 110 over a first network, and some others of the client devices 108 and the external resources 110 over a second network.

The group-based communication system 102 includes group-based communication server 104 and group-based communication repository 106. The group-based communication server may be configured, via one or more software modules, hardware modules, or a combination thereof, to access the network 112 for communicating with one or more of the client devices 108 and/or one or more of the external resources 110. Additionally or alternatively, the group-based communication server 104 may be configured, via software, hardware, or a combination thereof, to perform one or more of the operations disclosed herein with respect to managing admin-controlled access of external resources to group-based communication interfaces. For example, the group-based communication server may be configured with one or more application programming interfaces (APIs) accessible to the client devices 108 and/or external resources 110.

Group-based communication system 102 further includes group-based communication repository 106. The group-based communication repository 106 may be embodied by hardware, software, or a combination thereof, for storing, generating, retrieving, and/or otherwise managing data and information utilized by the group-based communication system to operate and provide services. The group-based communication repository 106 may be configured to store user account data, client device/trusted client device data, group-based communication interface data, organization data, admin account data, external resource access tokens and/or other data, single-interface access tokens, multi-interface access tokens, external resource identifiers, external resource access tokens, and/or other data associated with facilitating admin-controlled access of external resources (e.g., pending admin approval requests and/or external resource access requests).

The group-based communication repository 106 may be embodied in a myriad of forms. In some embodiments, the group-based communication repository 106 may be embodied by a single repository. In other embodiments, the group-based communication repository may include various sub-repositories. In some embodiments, the group-based communication repository 106 may be embodied by various known database implementations, including local repositories, cloud-based repositories, and/or a combination thereof.

Each of the client devices 108 may be embodied by any number of known computing devices in the art. Examples of client devices include personal computers, laptops, desktops, computing terminals, smartphones, tablets, personal digital assistants, wearable devices, smart home devices, and the like. A client device may be configured to access the group-based communication system via a software application executed on the client device, such as a local application, executable, or browser. The client device may be configured to render group-based communication interfaces and/or related information provided from by the group-based communication system.

For example, in some embodiments, a user launches or otherwise begins execution of a software application via one of the client devices 108. The software application may be provided by the group-based communication system 102, and/or a third-party system for downloading and/or installing software applications (e.g., an application store, not shown). The use may log in with valid user credentials to begin an authenticated session associated with a particular user account. During the authenticated session, the user may access functionality via group-based communication interfaces of which they are a member and can access. For example, the group-based communication system may cause rendering of various group-based communication interfaces, enabling the user to utilize the functionality offered associated with the group-based communication interface. Within a particular group-based communication interface, for example, a user associated with a user account may access functionality provided by the group-based communication system 102 and associated with one of the external resources 110. The user may, additionally or alternatively, request that one of the external resources not currently permissioned and/or provisioned to access a group-based communication interface be enabled to do so, as described herein.

Each of the external resources 110 represents an external system, resource, computer, or the like. An external resource may be permissioned and provisioned to access the group-based communication system 102 and/or be accessed by the group-based communication system 102. An external resource may be permissioned and provisioned to access a particular group-based communication interface, and thus the external resource may be referred to as a "approved" with respect to that group-based communication interface. A user of a client device associated with a corresponding user account may access functionality associated with one or more approved external resources of the external resources 110 from within a corresponding group-based communication interface, via the group-based communication system 102. For example, an external resource may be permissioned to provide information to and/or access information associated with a particular group-based communication interface managed by the group-based communication system. The group-based communication system may, additionally or alternatively, access one or more of the external resources 110 to retrieve information and/or provide functionality to the client devices 108. In some embodiments, the group-based communication system communicates with one or more external resources 110 (e.g., to retrieve data managed by the external resource) utilizing one or more corresponding APIs. Similarly, one or more of the external resources 110 may communicate with the group-based communication system (e.g., to read data from one or more group-based communication interfaces or provide data and/or functionality to one or more group-based communication interfaces) utilizing one or more corresponding APIs.

The group-based communication system 102 may be embodied by one or more computing systems, such as the apparatus 200 illustrated in FIG. 2. As illustrated in FIG. 2, the apparatus 200 may include a processor 202, a memory 204, an input/output module 206, a communications module 208, an admin approval management module 210, an access token management module 212, external resource management module 214, and a repository management module 216. The apparatus 200 may be configured, using one or more of the modules 202-216, to execute the operations described below.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, or a combination thereof, for enabling the apparatus 200 to carry out various functions in accordance with example embodiments of the present disclosure.

In some embodiments, each of the modules 202-216 may be embodied by hardware, software, or a combination thereof, for performing the operations described herein. In some embodiments, some of the modules 202-216 may be embodied entirely in hardware or entirely in software, while other modules are embodied by a combination of hardware and software.

The processor 202 may be embodied in a number of different ways and may, for example, including one or more processing devices configured to perform independently. Additionally or alternatively, the processor may include one or more processors configured in tandem via a bus to enable independent execution of instructions, pipelining, and/or multithreading. The processor 202 may include one or more sub-processors, cloud processors, connected processing circuitry, or the like.

In an example embodiment, the processor 202 may be configured to execute instructions stored in the memory 204, or otherwise accessible to the processor 202. Alternatively or additionally, the processor 202 may be configured to execute hard-coded functionality. As such, whether configured by hardware or software methods, or by a combination thereof, the processor 202 may represent an entity (e.g., physically embodied in circuitry) capable of performing operations according to an embodiment of the present invention when configured accordingly. Alternatively, as another example, when the processor is embodied as an executor of software instructions, the instructions may specifically configure the processor 202 to perform the algorithms and/or operations described herein when the instructions are executed.

In some embodiments, the apparatus 200 may include an input/output module 206 that may, in turn, be in communication with processor 202 to provide output to the user and, in some embodiments, to receive an indication of a user input. The input/output module may comprise a user interface and may include a display. In such embodiments, the user interface may comprise a web user interface, a mobile application, a client device, a kiosk, or the like. In some embodiments, the input/output module 206 may also include a keyboard, a mouse, a joystick, a touch screen, touch areas, soft keys, a microphone, a speaker, or other input/output mechanisms. The processor, or user interface circuitry including the processor, may be configured to control one or more functions of one or more user interface elements through computer program instructions (e.g., software and/or firmware) stored on a memory accessible to the processor (e.g., memory 204, onboard memory of the processor, and/or the like).

Meanwhile, the communications module 208 may be any means such as a device or circuitry embodied in either hardware or a combination of hardware and software that is configured to receive and/or transmit data from/to a network and/or any other device or module in communication with the apparatus 200. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receiving signals received via the antenna(s). In some environments, the communication interface may additionally or alternatively support wired communication. As such, for example, the communication interface may include a communication modem and/or other hardware/software for supporting communication via cable, digital subscriber line (DSL), universal serial bus (USB), or other mechanisms.

The admin approval management module 210 may be any means for managing an admin management API for handling various requests from admin devices. The admin approval management module 210 may be configured to manage external resource access requests and corresponding admin approval requests. In this regard, the admin approval management module 210 may be configured for, in conjunction with other modules such as the processor 202, receiving external resource access requests and generating, transmitting, and otherwise handling admin requests and received admin response transmissions associated with a received external resource access request. The admin approval management module 210 may also include means for setting external resource permissions statuses associated with external resources. The admin approval management module 210 may perform one or more of these operations utilizing one or more other modules, such as the processor 202, memory 204, communications module 208, and/or the like.

The access token management module 212 may be any means for storing, retrieving, generating, and/or otherwise handling external resource access tokens, single-interface access tokens, and multi-interface access tokens. The access token management module 212 may include means for obtaining a multi-interface access token for an external resource and a group-based communication interface, such as by retrieving it from a group-based communication repository or by generating it. The access token management module 212 may further include means for generating a single-interface access token for an external resource, and associating the single-interface access token with a multi-interface access token. The access token management module 212 may further include means for storing, or transmitting for storage, in a group-based communication repository a multi-interface access token and/or single-interface access token. The access token management module 212 may perform one or more of these operations utilizing one or more other modules, such as the processor 202, memory 204, repository management module 216, or the like.

The external resource management module 214 may be any means for accessing an external resource, and/or facilitating access of a group-based communication interface by an external resource, to provide functionality associated with the external resource. The external resource management module 214 may be configured for receiving an interface access request from an external resource, determining whether the external resource is permissioned and provisioned to access the group-based communication interface associated with the request, accessing the group-based communication interface and/or transmitting an appropriate response to the external resource. For example, the external resource management module 214 may include means for determining if a single-interface access token exists associated with the external resource and requested group-based communication interface, and if so, accessing the requested group-based communication interface to generate and provide an access response to the request. The external resource management module 214 may perform one or more of these operations utilizing one or more other modules, such as the processor 202, memory 204, communications module 208, and/or the like.

The repository management module 216 may be any means for retrieving from, storing to, and otherwise managing information in one or more repositories. In some embodiments, the repository management module 216 manages a single group-based communication repository configured to store all data/information required for performing the operations described herein. For example, the repository management module 216 may include means to at least retrieve and/or store a multi-interface access token associated with an external resource, retrieve and/or store a single-interface access token associated with an external resource and a group-based communication interface, retrieve and/or store external resource access tokens associated with an external resource, and the like. Additionally, the repository management module 216 may include means for storing data associated with or embodying group-based communications, group-based communication interfaces, user accounts, external resource, organizations, or other data objects. Additionally, the repository management module 216 may include means to generate and/or delete instances and/or sub-repositories of a group-based communication repository. The repository management module 216 may perform one or more of these operations utilizing one or more other modules, such as the processor 202, memory 204, and/or the like.

In some embodiments, one or more of the modules 202-216 may share hardware, to eliminate duplicate hardware requirements. Additionally or alternatively, in some embodiments, one or more of the modules 202-216 may be combined, such that a single module includes means configured to perform the operations of two or more of the modules 202-216. Additionally or alternatively, one or more of the modules 202-216 may be embodied by two or more submodules.

Example Architecture for Managed Access Via a Group-Based Communication System

FIG. 3A illustrates an example architecture including admin devices, client devices, and external resources configured for accessing a group-based communication system. The admin devices may be configured for accessing the group-based communication system associated with managing external resource access to one or more group-based communication interfaces, each group-based communication interface associated with an organization data object having an organization data identifier, in accordance with some example embodiments of the present disclosure. The external resources may be configured for communicating with the group-based communication system for accessing one or more group-based communication interfaces for providing services associated with the external resource. Further, the client device may be configured for communicating with the group-based communication system to communicate via one or more group-based communication interfaces, and/or access services associated with the external resource via the group-based communication system. The example architecture may, for example, include various devices and/or systems configured to communicate with one another over a network to perform various operations described herein.

The architecture includes group-based communication system 352. The group-based communication system 352 may be embodied, in some embodiments, by the apparatus 200, and may be configured to perform the one or more operations described herein. Group-based communication system 352 manages multiple organization data objects, specifically the organization data objects 354A-354N. Each organization data object may be associated with an organization, team, group, or other entity that has created an organization data object associated with their organization via the group-based communication system. For example, an executive, officer, or other administrator of an organization may create a corresponding organization data object via the group-based communication system 352. Each of the organization data objects 354A-354N may be associated with an organization identifier that uniquely identifies the organization data object. It should be appreciated that the group-based communication system 352 may manage any number of organization data objects associated with any number of organizations (e.g., including tens, hundreds, thousands, or more).

Each organization data object may be associated with any number of group-based communication interfaces also managed by the group-based communication system. Each group-based communication interface may provide functionality to a subset of user accounts for the group-based communication system 352 having permission to access the group-based communication interface. To link a group-based communication interface to a particular organization data object, the group-based communication interface identifier for the group-based communication interface may be associated with the organization identifier for the particular organization data object. For example, the group-based communication system 352 may maintain a mapping between an organization identifier for an organization data object and various group-based communication interface identifiers associated with that organization data object, and store the mapping in one or more repositories managed by the group-based communication system 352 (e.g., a group-based communication repository).

An organization data object may be associated with any number of group-based communication interfaces, for example tens, hundreds, thousands, or more group-based communication interfaces. Each group-based communication interface may be accessible to a different subset of user accounts associated with the group-based communication system 352. For example, organization data object 354A may be associated with the group-based communication interfaces 356A-356C, organization data object 354B may be associated with the group-based communication interfaces 358A-358E, and organization 354C may be associated with the group-based communication interfaces 360A-360N. Each of the group-based communication interfaces may facilitate communications between users associated with different sub-groups, tasks, projects, or the like. The various organization-linked group-based communication interfaces associated with an organization data object may be identified based on the organization identifier for the organization data object. For example, the group-based communication interfaces 356A-356C may be retrieved as organization-linked group-based communication interfaces based on the organization identifier for organization data object 354A. Similarly, the group-based communication interfaces 358A-358E may be retrieved as organization-linked group-based communication interfaces based on the organization identifier for organization data object 354B. In some embodiments, a repository managed by the group-based communication system 352, such as a group-based communication repository, may be queried based on an organization identifier to retrieve all organization-linked group-based communication interfaces associated with that organization identifier.

The group-based communication system 352 may be configured to access one or more external resources, and/or be accessed by the one or more external resources, for providing services via a group-based communication interface to users accessing the group-based communication interface by client devices. For example, the group-based communication system may communicate with one or more external resources via an interface access API, such as interface access API 364. Each external resource may be hosted on a third-party system, server, or the like. The interface access API 364 may integrate, or otherwise be configured to communicate, with each external resource, such as the external resources 366A-366N, for permissioning, provisioning, installing to a group-based communication interface, and/or providing services. In some embodiments, each of the external resources 336A-366N and the communication system 352 communicate entirely via the interface access API 364, and/or sub-APIs or associated APIs thereof. In some other embodiments, each of the external resources 366A-366N may be associated with a module, component, and/or API for receiving information, service requests, or the like, transmitted from the group-based communication system 352, such as via the interface access API 364. For example, each of the external resources 366A-366N may be configured to receive communications from the group-based communication system 352 via a corresponding external resource access API, such as the corresponding external resource access APIs 368A-368N.

The group-based communication system 352 may maintain one or more external resource access tokens for accessing a corresponding external resource. In some embodiments, the group-based communication system 352 may maintain one external resource access token per external resource, which all user accounts may utilize to access the external resource from within a group-based communication interface. In other embodiments, the group-based communication system 352 may maintain an external resource access token per group-based communication interface per external resource, where the external resource access token may be used provide the requested services.

The external resources 366A-366N may access one or more of the group-based communication interfaces 356A-356C, 358A-358E, and 360A-360N via the interface access API 364. For example, the external resources may, via the interface access API 364, update information associated with a group-based communication interface based on services provided by one of the external resources 366 in response to an external resource service request transmitted via one of the client devices 370.

The architecture further includes client devices 370A-370N (referred to as "client devices 370"). Each client device may be configured to execute a software application, such as the software applications 372A-372N (referred to as "software applications 372"), for communicating with, and accessing functionality associated with, the group-based communication system 352. The software applications 372 may be a native software application executed on one of the client devices 370. Alternatively, the software applications 372 may be a browser application executed on one of the client devices 370 and configured for communicating with the group-based communication system 352. The software applications 372 may be configured to utilize the hardware associated with one of the corresponding client devices 370 to receive user input (e.g., a touch screen, mouse/keyboard, or the like) and communicate with the group-based communication system 352 (e.g., a networking interface).

A user associated with a user account may utilize one of the client devices 370 to communicate with the group-based communication system 352 to access one or more group-based communication interfaces. The client devices 370 may receive information from the group-based communication system 352 via the client access API 374. In some embodiments, for example, the user account may be associated with a particular organization data object (such as where the user account is associated with a user that is a member of the organization). The user account may have access to various group-based communication interfaces having group-based communication interface identifiers for which the user account was permissioned to access. A user may access a group-based communication interface to communicate within the group-based communication channels within the group-based communication interface, access functionality associated with approved external resources, and/or request access for other external resources as described herein.

An administrator user may create new group-based communication interfaces and associate the group-based communication interfaces with the corresponding organization data object by associating the group-based communication interface with the organization identifier. Each organization data object may be associated with one or more admin user accounts having permissions to manage access to, or other information associated with, each organization-linked group-based communication interface for that organization data object. An admin user associated with an admin user account may utilize an admin device to communicate with the group-based communication system 352 to authenticate user credentials associated with the admin user account. After authenticating user credentials associated with an admin user account, the admin may begin an authenticated session associated with that admin user account such that the administrator may communicate with the group-based communication system 352, via the admin device, to manage information associated with a corresponding organization data object for which the admin user account has admin permissions.

The admin device may communicate with the group-based communication system 352 via an admin management API 362. The admin management API may be configured to enable the admin device to interact with the organization data objects and/or associated organization-linked group-based communication interfaces, and/or corresponding information, stored by the group-based communication system 352. For example, the admin device may render an administrative management interface for providing an admin response indications to pending external resource access requests, managing an external resource request rule set associated with an organization identifier, and/or otherwise managing external resource access to one or more organization-linked group-based communication interfaces. The admin management API 362 may be used to visualize the organization-linked group-based communication interfaces associated with a particular organization data object having an organization identifier, and manage the external resource permissions status for one or more external resource for each organization-linked group-based communication interface. Transmission from the admin devices 350 to the group-based communication system 352 may each be received and processed by the admin management API 362.

An administrator may begin an authenticated session associated with an admin account via one of the admin devices 350, and manage the one or more group-based communication interfaces associated with the organization data object for which the admin account is associated with administrator permissions. For example, the admin device 350A may be associated with an admin account permissioned to manage organization data object 354A. The admin device 350A may, through communication with the admin management API 362, manage information associated with the organization data object 354A and/or the organization-linked group-based communication interfaces 356A-356C. For example, the admin device 350A may manage the access permissions of external resources for each of the organization-linked group-based communication interfaces 356A-356C. The admin device 350B may, through communication with the admin management API 362, manage information associated with the organization data object 354B and/or the organization-linked group-based communication interfaces 358A-358E.

In some embodiments, each of the admin management API 362, client access API 374, and interface access API 364 may be entirely separate. In other embodiments, some of the functionality associated with the APIs may be performed by a single API. Further, in some embodiments, each of the APIs may be embodied by a single API.

FIG. 3B illustrates an example depiction of an architecture for managing admin-controlled access to group-based communication interface(s) by external resource(s), in accordance with example embodiments as disclosed herein. The example architecture may, for example, be managed by a group-based communication system such as the group-based communication system 352, with the assistance of, and/or under the control of, an apparatus 200. The example architecture may be managed entirely via software modules executed by the group-based communication system 352, or as a combination of software and hardware modules.

FIG. 3B includes organization data objects 302A and 302B. An organization data object may correspond to an entity, being, team or group of individuals. Each of the organization data objects 302A and 302B may be associated with an organization identifier that uniquely identifies the organization data object.

Each organization data object may be associated with one or more user accounts that are members of the organization. In some embodiments, the organization data object is associated with one or more admin accounts that are configured to manage one or more group-based communication interfaces. For example, an admin user account may be permissioned to manage app permissions by responding to admin requests transmitted by the group-based communication system. In some embodiments, an organization data object is associated with an owner account that created or registered the organization data object with the group-based communication system. The organization data object may further include other admin accounts that were permissioned to become admin accounts, for example by the user via the owner account, or by another admin account.

Further, each organization data object may be associated with various group-based communication interfaces, each group-based communication interface associated with the organization identifier for the organization data object, thus linking the group-based communication interface to the organization data object. For example, organization data object 302A may be associated with two group-based communication interfaces, specifically group-based communication interface 304A, and group-based communication interface 304B. Because the group-based communication interfaces 304A and 304B are each associated with the same organization data object 302A, these group-based communication interfaces represent organization-linked group-based communication interfaces with respect to organization data object 302A. For a given organization data object having a corresponding organization identifier, all organization-linked group-based communication interfaces may be retrieved (for example, from a group-based communication repository) using the organization identifier. Similarly, organization data object 302B may be associated with two group-based communication interfaces, specifically group-based communication interface 304C and group-based communication interface 304D. Thus, the group-based communication interfaces 304C and 304C are each associated with the same organization data object 302B, these group-based communication interfaces represent organization-linked group-based communication interfaces with respect to organization data object 302B The group-based communication interfaces 304A-304D may be permissioned differently with respect to access by external resource 306A and external resource 306B. An external resource may only be able to access information associated with a group-based communication interface for which it has been approved to access and corresponding authentication tokens have been generated for doing so. When a user having a user account within a group-based communication interface requests addition of an external resource, an admin approval process as described herein may begin before the external resource is enabled to access the group-based communication interface and provide services. In such embodiments, an external resource must be approved by an admin account associated with the organization data object that created or otherwise is associated with the group-based communication interface in which the external resource was requested before the external resource may access the group-based communication interface. Each group-based communication interface may be associated with different external resources that are permissioned and/or provisioned to access said group-based communication interface.

For example, each of the group-based communication interfaces 304A-304D are associated with different permissions with respect to the external resources 306A and 306B. As illustrated, with respect to group-based communication interface 304A, an admin account approved access for external resource 306B and thus the external resource is associated with an approved status, which is the only external resource permissioned and/or provisioned to access the group-based communication interface 304A. With respect to 304B, an admin account approved access for external resource 306A and thus the external resource is associated with an approved status. A user account accessing the group-based communication interface 304B has requested approval of external resource 306B, but no admin account has yet approved, and thus the external resource 306B is associated with a requested status. An admin account for the organization data object 302A may, by accessing the group-based communication system via a client device and authenticating with admin credentials for beginning an authenticated session, may receive an admin request via the group-based communication system and provide an admin response transmission (e.g., including an admin approval or an admin rejection).

As illustrated, with respect to group-based communication interface 304C, an admin account associated with the organization data object 302B has approved access by external resource 306B, but rejected access by external resource 306A. An admin account for an organization may opt to reject access by an external resource for various reasons. For example, an administrator accessing the group-based communication system via an admin account may decide that, based on the external resource access request associated with the external resource, the external resource requests various scopes associated with significant data exposure of information available via the requested group-based communication interface, such that it is unsafe to approve the external resource.

When approving access by a particular external resource to a particular group-based communication interface, an administrator (via an admin account) may also approve the external resource for accessing one or more other organization-linked group-based communication interfaces other than the requested group-based communication interface. For example, in response to an admin approval request associated with a requested group-based communication interface and a particular external resource, the group-based communication system may receive an admin response indication including one or more additional admin approvals associated with the external resource and one or more organization-linked group-based communication interfaces associated with the requested group-based communication interface. The group-based communication system may then, in response, automatically permission and/or provision the external resource for accessing the organization-linked group-based communication interface(s), and enable user accounts within the organization-linked group-based communication interfaces to access functionality associated with the external resource without a subsequent external resource access request.

Additionally or alternatively, an administrator (via an admin account) may pre-approve access by the external resource to one or more organization-linked group-based communication interfaces. In some embodiments, for example, upon pre-approval, a record is generated and/or updated to include a pre-approved status, external resource identifier and group-based communication interface identifier. The particular group-based communication interface identifier may be associated with the pre-approved organization-linked group-based communication interface. In some embodiments, when a user later seeks to add the external resource to a group-based communication interface that is pre-approved, the group-based communication system may indicate to the user that the external resource is pre-approved and/or otherwise may be installed without admin permission.

As such, in some embodiments, when a user later desires to install the pre-approved external resource to an organization-linked group-based communication interface, such as by receiving a future external resource access request associated with the organization-linked group-based communication interface and pre-approved external resource, the external resource may be permissioned, and provisioned/or, without requiring a subsequent admin approval request. For example, the group-based communication system may query a repository for a record associated with the group-based communication interface identifier and external resource identifier including one or more records comprising approval statuses for a requested group-based communication interface, and receive or retrieve, as result data, a record comprising the pre-approved status for the external resource and group-based communication interface. Alternatively or additionally, pre-approval of an external resource may be associated with an automatic approval rule in an external resource request rule set associated with the organization data object. As illustrated, for example, external resource 306B may be pre-approved by an admin account in response to an external resource access request, associated with the group-based communication interface 304C and external resource 306B, received by the group-based communication system.

The connections between group-based communication interfaces 304 and external resources 306, as illustrated in FIG. 3B, may be managed by a group-based communication system as described herein. A group-based communication system may store one or more records in one or more data structures, tables, or the like, within a group-based communication repository representing the various connections illustrated. For example, a group-based communication system may store, in one or more data structures, a group-based communication interface identifier, external resource identifier, permission status, approver admin account identifier, requester user account identifier, single-interface access token, multi-interface access token, and/or other data values associated with the external resource access request and/or corresponding admin response.

It should be appreciated that the architecture depicted in FIG. 3B, and the connections therein, are non-limiting examples and meant for illustrative purposes only, and are not to limit the scope or spirit of the disclosure herein.

Example Operations for Providing Organization Administrative Information to a Client Device for Rendering FIG. 4 broadly illustrates a flowchart containing a series of operations performed by a group-based communication system for providing organization administrative information to an admin user account associated with an authenticated session executed via a client device, in accordance with example embodiments described herein. The group-based communication system may provide the organization administrative information to cause the client device to render an administrative management interface based on the provided organization administrative information. Utilizing the administrative management interface, an administrator associated with an admin account may approve pending external resource access requests and/or manage an external resource request rule set for the organization identifier for which the admin user account is permissioned as an administrator. The operations illustrated in FIG. 4 may, for example, be performed by a group-based communication system 102, with the assistance of, and/or under the control of, an apparatus 200.

At block 402, the apparatus 200 includes means, such as admin approval management module 210, communications module 208, processor 202, and/or the like, to receive, from an admin device, an admin authentication request comprising admin user credentials. For example, an administrator accessing the admin device may provide the admin user credentials via a login interface provided by the group-based communication system and rendered to the admin device via a software application. In some embodiments, the admin user credentials include at least a username and a password associated with an admin account. In some embodiments, the admin authentication request is received via an admin management API.

At block 404, the apparatus 200 includes means, such as admin approval management module 210, repository management module 216, processor 202, and/or the like, to authenticate the admin user credentials associated with an admin account. In some embodiments, the apparatus may query a group-based communication repository to determine if the provided admin user credentials correspond to an existing admin account. If the provided admin user credentials do not correspond to an existing admin account, the apparatus may transmit a login error and request admin user credentials again until matching user authentication credentials are received. If the received admin user credentials do correspond to an existing admin user account, the apparatus may launch an authenticated session associated with the admin user account and the client device. During the authenticated session, the user of the client device may access data permissioned as accessible to the admin account.

At block 406, the apparatus 200 includes means, such as admin approval management module 210, repository management module 216, processor 202, and/or the like, to determine an organization identifier associated with the admin account. The organization identifier may be associated with an organization data object for which the user is an administrator. In some embodiments, for example, the apparatus 200 may query a group-based communication repository to determine the organization identifier associated with the admin account, and receive the organization identifier as a response. In some embodiments, the admin account may include the organization identifier for which it is an administrator. Additionally or alternatively, the apparatus 200 may receive, via the client device, an organization identifier associated with the admin account (e.g., an organization identifier selected from a set of organization identifiers associated with organization data objects for which the user is an administrator).

At block 408, the apparatus 200 includes means, such as admin approval management module 210, repository management module 216, processor 202, and/or the like, to identify an organization-linked group-based communication interface set associated with the organization identifier. The organization-linked group-based communication interface set includes all, or a subset, of group-based communication interfaces each associated with the organization identifier. In some embodiments, the apparatus 200 may query a group-based communication repository, or a sub-repository thereof, using the organization identifier and receive the organization-linked group-based communication interface set as result data, the organization-linked group-based communication interface set including each group-based communication interface associated with the organization identifier.

At optional block 410, the apparatus 200 includes means, such as admin approval management module 210, repository management module 216, processor 202, and/or the like, to retrieve a pending admin approval request set associated with the organization-linked group-based communication interface set. The pending admin approval request set may include an admin approval request associated with any external resource access request for which an admin response transmission has not yet been received (e.g., external resource access requests that have not yet been approved nor rejected by an admin account). In some embodiments, the apparatus may query a group-based communication repository, or a sub-repository thereof, based on at least the group-based communication interface identifiers associated with the organization-linked group-based communication interfaces. In response to the query, the apparatus 200 may receive, as result data, the pending admin approval request set including all pending admin approval requests (or a subset thereof) associated with each of the organization-linked group-based communication interfaces. For example, the apparatus 200 may query a database or other repository for records comprising a pending status for external resource permission status, and being associated with one of the organization-linked group-based communication interface identifiers for the organization-linked group-based communication interfaces, and receive the pending admin approval request set, which may include no records or may include at least one record, as response data to the query.

At optional block 412, the apparatus 200 includes means, such as admin approval management module 210, repository management module 216, processor 202, and/or the like, to retrieve an external resource request rule set associated with the organization identifier. The external resource request rule set may include various external resource access rules, or various subsets including various external resource access rules. For example, the external resource request rule set may include an automatic approval rule or an automatic approval rule set for determining whether an external resource access request should be automatically approved without requiring an admin request. Additionally or alternatively, the external resource request rule set may include an automatic rejection rule or automatic rejection rule set for determining whether an external resource access request should be automatically rejected without requiring an admin request. Additionally or alternatively, in some embodiments, the external resource request rule set may include an admin approval required rule or an admin approval required rule set for determining whether an external resource access request requires admin approval in response to an admin request. Admin approval required rule(s) may be used in circumstances where an administrator changes a default approval response. For example, in some embodiments, admin approval may be automatic for some group-based communication interfaces, unless otherwise indicated by an external resource request rule. It should be appreciated that the external resource request rule set may be configured by one or more admin accounts of an organization, and stored associated with the organization identifier, as described below, for example with respect to FIG. 5.

In some embodiments, the apparatus 200 may query a group-based communication repository, or a sub-repository thereof, based on the organization identifier. In response to the query, the apparatus 200 may receive, as result data, the external resource request rule set stored associated with the organization identifier.

At block 414, the apparatus 200 includes means, such as admin approval management module 210, communications module 208, processor 202, and/or the like, to provide, to the admin device for rendering, one or more selected from the group of (1) the organization-linked group-based communication interface set, (2) the pending admin approval request set, and/or (3) the external resource request rule set. The apparatus may cause rendering of an administrative management interface including one or more of the retrieved data sets. The administrative management interface may be configured to enable the administrator user to perform various actions associated with the organization-linked group-based communication interface set, the pending admin approval request set, and/or the external resource request rule set.

For example, the administrative management interface may enable the user to view each organization-linked group-based communication interface associated with an organization identifier for which the user is an administrator (e.g., based on the admin account associated with authenticated session). Additionally, or alternatively, the administrative management interface may enable the user to view each external resource approved to access the various organization-linked group-based communication interfaces.

Additionally or alternatively, the administrative management interface may include an interface component for transmitting an admin response transmission for one or more admin approval requests in the pending admin approval request set. For example, the administrative management interface may include a separate interface component associated with each admin approval request, where the interface component may be used to transmit an admin response transmission including either an admin approval or an admin rejection. Additionally or alternatively, the administrative management interface may include one or more interface components for approving access to one or more other organization-linked group-based communication interfaces of an external resource associated with a pending admin approval request. For example, the administrative management interface may include one or more interface components for approving an external resource for accessing one or more organization-linked group-based communication interfaces, even though an external resource access request may not have been received associated with that external resource and group-based communication interface. Accordingly, the administrative management interface may enable an administrator to approve access of an external resource to one group-based communication interface, and enable the administrator to approve access of the external resource to multiple organization-linked group-based communication interfaces without requiring subsequent admin approval requests.

Additionally or alternatively, the administrative management interface may include an interface component for generating and/or editing an external resource request rule set associated with the organization identifier. For example, an administrator may utilize an interface component of the administrative management interface to create a new external resource access rule for including in the external resource request rule set for the organization identifier. The new external resource access rule may embody, for example, an automatic approval rule, an admin approval required rule, or an automatic rejection rule, which is then stored in the external resource request rule set, and/or a subset thereof, associated with the organization identifier. Additionally or alternatively, an administrator may utilize another interface component of the administrative management interface to edit existing external resource access rules in the external resource request rule set, or delete existing rules from the external resource request rule set. In some embodiments, the external resource request rule set may be transmitted to the group-based communication system after the administrator has performed one or more actions for editing, adding, and/or deleting external resource request rules, as described be operations depicted in FIG. 5.

Example Operations for Receiving an External Resource Request Rule Set Associated with Organization Identifier FIG. 5 broadly illustrates a flowchart containing a series of operations for receiving an external resource request rule set associated with a particular organization identifier, in accordance with example embodiments described herein. The external resource request rule set may be received from a client device executing an authenticated session associated with an admin account, where the admin account is associated with admin permissions for the organization identifier. The operations illustrated in FIG. 5 may be performed by a group-based communication system 102, with the assistance of, and/or under the control of, an apparatus 200.

At block 502, the apparatus 200 includes means, such as the admin approval management module 210, communications module 208, processor 202, and/or the like, to cause rendering of an administrative management interface to a client device. An administrator user may access the client device during an authenticated session associated with an admin account, for example via one or more of the operations illustrated and described above with respect to FIG. 4.

At block 504, the apparatus 200 includes means, such as the admin approval management module 210, communications module 208, processor 202, and/or the like, to receive an external resource request rule set from the client device. The apparatus 200 may receive the external resource request rule set in response to user engagement with an interface component of the administrative management interface rendered to the client device. For example, the administrative management interface may include one or more components for adding, editing, and/or deleting external resource request rules from the external resource request rule set, and the external resource request rule set may be received after one or more external resource request rules have been added, edited, and/or deleted. Alternatively, in some embodiments, the administrative management interface may include an interface component (e.g., a "submit" or "save" button) for transmitting the external resource request rule set after the administrator has made all changes, additions, and/or deletions they would like.

The external resource request rule set may, in some embodiments, be empty such that no external resource request rules are utilized to automatically respond to future external resource access requests. Alternatively, each external resource request rule set may be associated with requirements for one or more values of a metadata set associated with an external resource access request. For example, an external resource request rule may automatically approve or reject an external resource access request associated with a particular scope. Alternatively or additionally, another external resource request rule may automatically approve or reject an external resource access request associated with a particular external resource developer identifier (e.g., may automatically approve a trusted developer, or automatically reject an untrusted developer). It should be appreciated that an external resource request rule may be created that makes an automatic approval or automatic rejection determination based on any value, or combination of values, in a request metadata set.

At block 506, the apparatus 200 includes means, such as the admin approval management module 210, repository management module 216, processor 202, and/or the like, to identify an organization identifier associated with the received external resource request rule set. In some embodiments, the apparatus 200 may receive the organization identifier from the client device, for example at block 504 along with the external resource request rule set. In other embodiments, the apparatus may identify an organization identifier for which the admin account associated with the client device has administrative permissions. In some embodiments, the apparatus may query a group-based communication repository, or a sub-repository therein, for an organization identifier for which the admin account has administrative permissions, and receive the organization identifier as result data.

At block 508, the apparatus 200 includes means, such as repository management module 216, processor 202, and/or the like, to store the external resource request rule set associated with the organization identifier. In some embodiments, the apparatus 200 may store the external resource request rule set in a group-based communication repository such that the external resource request rule set may be retrieved utilizing the organization identifier. By storing the external resource request rule set associated with the organization identifier, the apparatus 200 may later retrieve the stored external resource request rule set when a later-received external resource access request is received associated with a group-based communication interface that is associated with the organization identifier. The stored external resource request rule set may be retrieved and utilized to determine whether the external resource access request should be automatically approved, automatically rejected, or require admin approval, as described below with respect to FIG. 7.

Example Operations for Managing Admin-Controlled Access of Group-Based Communication Interfaces by an External Resource FIGS. 6, 7, 8A and 8B broadly illustrate flowcharts containing a series of operations performed by a group-based communication system for managing admin-controlled access of group-based communication interface(s) by an external resource, in accordance with example embodiments described herein. The operations illustrated in each of FIGS. 6, 7, 8A and/or 8B may be performed by a group-based communication system 102, with the assistance of, and/or under the control of, an apparatus 200.

FIG. 6 broadly illustrates operations for receiving an external resource access request, requesting and receiving an admin response indication to the request, and configuring the system based on the admin response indication, in accordance with example embodiments described herein.

At block 602, the apparatus 200 includes means, such as the communications module 208, processor 202, and/or the like, to receive an external resource access request from a client device. The client device may be executing an authenticated session, where the authenticated session is associated with a user account authenticated by the apparatus at an earlier time.

In some embodiments, the apparatus 200 embodying the group-based communication system may provide an interface, application, or the like, to the client device for transmitting external resource access request(s). For example, the apparatus 200 may generate, retrieve configure, and/or otherwise provide an external resource library, for example as an application store-style interface, for browsing external resources that are configured to be added to the requested group-based communication interface. In some embodiments, the apparatus 200 may query a database, or other repository, for records based on the requested group-based communication interface identifier, and receive a record set associated with external resources already approved and installed to the requested group-based communication interface, and external resources approved or pre-approved but not installed to the requested group-based communication interface. The record set may additionally include records associated with the requested group-based communication interface identifier, and having a requested status.

Based on the retrieved record set, the apparatus 200 may configure the external resource library, or similar interface, to present components for requesting approval for each external resource not yet having a requested, pre-approved, or approved status. For example, for each external resource not associated with a record having a requested, pre-approved, or approved status, an interface component may be provided that, in response to user engagement, transmits an external resource access request to the apparatus 200, associated with at least the requested group-based communication interface and the corresponding external resource (for example, where the external resource access request comprises the requested group-based communication interface identifier and the external resource identifier). Additionally or alternatively, the apparatus 200 may configure the external resource library, or similar interface, to present components for installing approved or pre-approved external resources to the requested group-based communication interface. For example, for each external resource associated with a record having a pre-approved or approved status, an interface component may be provided that is configured to, in response to user engagement, transmit an external resource installation request to the apparatus 200, associated with at least the requested group-based communication interface and the corresponding external resource (for example, where the external resource installation request comprises the requested group-based communication interface identifier and the external resource identifier). Engagement with a component configured for transmitting an external resource installation request may jump to a further block in the flow (e.g., to a block for installing and/or provisioning the external resource for access to, and use access via, the requested group-based communication interface, for example block 615).

The external resource access request may represent a request by a user associated with the user account to permission and/or provision an external resource to access a requested group-based communication interface for providing functionality within the group-based communication interface. In some embodiments, the external resource access request includes at least a group-based communication interface identifier associated with the requested group-based communication interface, and an external resource identifier associated with the external resource. The external resource access request may additionally include a request metadata set that includes one or more of: a user account identifier associated with the user account that made the request, scope identifiers requested to be accessible by the external resource (for example, indicating what data may be accessed by the external resource), external resource description information, developer information associated with the developer of the external resource (for example, a developer identifier), historical information regarding the developer (such as reviews, other external resources associated with the developer, and the like), an internal developer indicator (such as a bit flag indicating whether the external resource is associated with a developer account associated with the organization identifier and/or group-based communication system). Additionally or alternatively, the request metadata set may include an external resource identifier for the external resource associated with the request, and/or a requested group-based communication identifier for the requested group-based communication interface.

At block 604, the apparatus 200 includes means, such as the admin approval management module 210, repository management module 216, processor 202, and/or the like, to identify an organization identifier associated with the requested group-based communication interface. Each group-based communication interface may be associated with an organization data object that the group-based communication interface was created associated with. In some embodiments, the apparatus may be configured to identify the organization identifier associated with the requested group-based communication interface using a group-based communication repository. For example, the apparatus may query the group-based communication repository for an organization identifier, or an organization data object having an organization identifier, associated with the group-based communication interface identifier for the requested group-based communication interface (e.g., the organization data object that created and/or is managing the group-based communication interface).

At decision 606, the apparatus 200 includes means, such as admin approval management module 210, repository management module 216, and/or the like, to determine if the organization identifier is associated with an external resource request rule set. In some embodiments, the apparatus 200 queries a group-based communication repository, or a sub-repository thereof (such as a rule set repository), based on the organization identifier. If an external resource request rule set is stored associated with the organization identifier, the group-based communication repository may return result data including the external resource request rule set. Otherwise, the group-based communication repository may return empty result data.

Decision 606 represents a split between two sub-processes for obtaining an admin response indication. In some embodiments, an admin response indication is obtained manually from an administrator associated with an admin account, for example as described with respect to the blocks 608-612. In other embodiments, an admin response indication is obtained automatically in response to a determination based on an external resource request rule set, for example as described with respect to the blocks 702-716.

If, at decision 606, the apparatus 200 determines the organization identifier is not associated with an external resource request rule set (e.g., no external resource request rules have been created associated with the organization data object), flow continues to block 608.

At block 608, the apparatus 200 includes means, such as admin approval management module 210, communications module 208, processor 202, and/or the like, to transmit an admin approval request to an admin device for the organization identifier. In some embodiments, the admin device is executing an authenticated session associated with the admin account, such that the user associated with the admin device has authenticated themselves with respect to the admin account (such as by logging in) and is accessing the group-based communication system via the admin device. In some embodiments, the admin approval request is transmitted when an admin device contacts the group-based communication system to receive pending admin approval requests. In some embodiments, the admin approval request may be transmitted to be rendered to an administrative management interface, as discussed above with respect to FIG. 4.

In some embodiments, the admin approval request is associated with the external resource access request received at block 602 (e.g., the admin approval request is associated with receiving admin approval and/or rejection for that external resource access request). In some embodiments, the apparatus 200 includes means to generate and/or construct the admin approval request for transmittal. The admin approval request may include at least the group-based communication interface identifier associated with the requested group-based communication interface and an external resource identifier associated with the external resource. In some embodiments, the admin approval request may additionally include some or all of the request metadata set associated with the eternal resource access request. For example, the admin approval request may include a user account identifier associated with the user account that made the request, scope identifiers requested to be accessible by the external resource, external resource description information, developer information associated with the developer of the external resource (for example, a developer identifier), historical information regarding the developer, an internal developer indicator, and the like, or any combination thereof. Additionally or alternatively, in some embodiments, a request metadata set includes an external resource identifier for an external resource and/or a group-based communication interface identifier for a requested group-based communication interface.

At optional block 610, the apparatus 200 includes means, such as admin approval management module 210, repository management module 216, processor 202, and/or the like, to set an external resource permission status for the external resource associated with the requested group-based communication interface to a requested state. In some embodiments, the apparatus 200 may generate and/or update a record in a group-based communication repository, where the record is keyed and/or otherwise associated with a group-based communication interface identifier for the requested group-based communication interface and an external resource identifier associated with the external resource. In some embodiments, the apparatus 200 is configured to indicate to a requesting user that a second user has already requested a particular external resource by external resource permission status associated with the external resource, and may prevent subsequent external resource access requests from being transmitted associated with the requested group-based communication interface and the particular external resource.

At block 612, the apparatus 200 includes means, such as the admin approval management module 210, communications module 208, processor 202, and/or the like, to receive an admin response transmission from the admin device, including an admin response indication associated with the requested group-based communication interface and the external resource. The admin response indication may embody an admin approval or an admin rejection.

At block 614, the apparatus 200 includes means, such as the admin approval management module 210, repository management module 216, processor 202, and/or the like, to set an external resource permission status for the external resource associated with the group-based communication interface, the external resource permission status based on the admin response indication. In some embodiments, the apparatus 200 may generate and/or update a record in a group-based communication repository, where the record is keyed and/or otherwise associated with a group-based communication interface identifier for the requested group-based communication interface and an external resource identifier associated with the external resource. For example, the external resource permission status may be set to an approved status if the admin response indication represents an admin approval, and the external resource permission status may be set to a rejected status if the admin response indication represents an admin rejection.

Upon setting the external resource permission status, one or more user accounts associated with one or more users may be notified and/or receive information regarding the set external resource permission status. In some embodiments, a user account indicated as the requesting user account associated with the external resource access request at an earlier block, for example block 602, may be notified regarding the external resource permission status. If the admin response indication represents an admin approval, the requesting user account may be notified the external resource was approved, and that the external resource may be provisioned and/or installed to the requested group-based communication interface upon request by a user. Additionally or alternatively, one or more other user accounts that are members of, or otherwise associated with, the requested group-based communication interface may similarly be notified. For example, all user accounts that are members of the group-based communication interface may be notified, user accounts associated with roles may be notified, or another sub-group of user accounts may be notified.

At optional block 615, the apparatus 200 may include means, such as communications module 208, processor 202, and/or the like, or a combination thereof, to receive, from a client device, an external resource installation request associated with the external resource and the requested group-based communication interface. In some embodiments, the client device may be the same client device from which the external resource access request was received at an earlier block, for example block 602. In other embodiments, the client device may be a second client device controlled by the same or another user. For example, in some embodiments, a second user, via any of one or more client devices communicable with the apparatus 200, may transmit the external resource installation request.

The external resource installation request includes data configured to provision, permission, and/or otherwise install the external resource for access via the requested group-based communication interface. For example, a user associated with a user account permissioned to access the requested group-based communication interface may transmit the external resource installation request after the external resource has been approved by an administrator with respect to the requested group-based communication interface. In some embodiments, the external resource installation request includes at least an external resource identifier and a group-based communication interface identifier. Additionally or alternatively, the external resource installation request may include a requestor identifier.

The apparatus 200 may perform one or more steps for provisioning, or otherwise installing the approved external resource for access via the requested group-based communication interface. Upon completion of the permissioning, provisioning, and/or installation process, the external resource is configured to access the requested group-based communication interface, and users may access functionality associated with the external resource from within the requested group-based communication interface. In some embodiments, for example, one or more of the operations described with respect to block 616 may define an example provisioning and/or installation process.

Optionally, in some embodiments at block 616, flow may continue to point C, illustrated in FIG. 8A, for generating, configuring, and otherwise managing various access tokens. In some embodiments, flow continues to point C illustrated in FIG. 8A when the admin approval value received at block 612 embodies an admin approval, and a subsequent external resource installation request has been received from a user. The operations beginning at point C illustrated in FIG. 8A are discussed further below.

At optional block 618, the apparatus 200 includes means, such as admin approval management module 210, processor 202, and/or the like, to determine whether the admin response transmission includes at least one additional admin response. In some embodiments, the admin response transmission includes at least one additional admin response for the external resource associated with at least one additional group-based communication interface associated with the organization identifier. For example, in some embodiments, an administrator may approve access of the external resource to the requested group-based communication interface and additionally approve access of the external resource to one or more additional group-based communication interfaces associated with the organization identifier (e.g., other group-based communication interfaces created and/or managed by the organization). In such embodiments, the admin response transmission may additionally include an additional admin approval set, the additional admin approval set including each additional admin approval for the external resource associated with each additional group-based communication interface approved by the administrator.

At optional block 620, the apparatus 200 includes means, such as the admin approval management module 210, repository management module 216, processor 202, and/or the like, to set at least one additional external resource permission status for the external resource associated with at least one additional group-based communication interface based on the at least one additional admin response. For example, if the admin response transmission includes an additional admin approval for the external resource associated with an additional group-based communication interface (e.g., an administrator has approved the external resource for accessing the additional group-based communication interface), the apparatus 200 may set the external resource permission status for the external resource associated with the additional group-based communication interface to an approved status. Alternatively, if the admin response transmission includes an additional admin rejection for the external resource associated with an additional group-based communication interface (e.g., an administrator rejected the external resource from accessing the additional group-based communication interface), the apparatus 200 may set the external resource permission status for the external resource associated with the additional group-based communication interface to a rejected status. In some embodiments where the administrator approved and/or rejected access to multiple group-based communication interfaces, the admin response transmission may include an additional admin response set including a plurality of additional admin responses associated with a plurality of additional group-based communication interfaces. In such embodiments, the apparatus 200 may set the external resource permission status for the external resource associated with each of the additional group-based communication interfaces based on the corresponding additional admin response in the additional admin response set.

Optionally, at block 622, flow may continue to point D, illustrated in FIG. 8B, for generating, configuring, and otherwise managing various access tokens. In some embodiments, flow continues to point D illustrated in FIG. 8B when at least one additional admin response embodies an admin approval for the external resource associated with at least one additional group-based communication interface. Each additional group-based communication interface may share a common organization identifier with the requested group-based communication interface, such that the administrator may set permissions associated with various group-based communication interfaces created and/or managed associated with a single organization. The operations beginning at point D illustrated in FIG. 8B is discussed further below.

Returning to decision 606, if the organization identifier is associated with an external resource request rule set, flow continues to sub-process A illustrated by FIG. 7. FIG. 7 broadly illustrates operations for managing admin approval of a received external resource access request based on an external resource request rule set, in accordance with example embodiments described herein.

At block 702, the apparatus 200 includes means such as admin approval management module 210, processor 202, and/or the like, to extract a request metadata set associated with the external resource access request. The request metadata set may include various information associated with the external resource access request. For example, the request metadata set may include a requesting user account identifier and/or client device identifier, one or more requested scope identifiers requested to be accessible by the external resource, external resource description information, developer information associated with the developer of the external resource (for example, a developer identifier), historical information regarding the developer, an internal developer indicator, and the like. Additionally or alternatively, in some embodiments, the request metadata set includes a requested group-based communication interface identifier for the requested group-based communication interface.

At decision 704, the apparatus 200 includes means, such as admin approval management module 210, processor 202, and/or the like, to determine if the request metadata set satisfies an external request rule in the external resource request rule set associated with the organization identifier. For example, in some embodiments, the external resource request rule set may include at least one rule provided by an admin account and stored associated with the organization identifier. The external resource request rule may perform one or more checks associated with the various information in the request metadata set. For example, an example external resource request rule may be satisfied if the developer identifier associated with the external resource is within a predefined list of developer identifiers (e.g., developer identifiers that have been pre-approved as trustworthy or pre-rejected as unsafe). Another example external resource request rule may be satisfied if the requested scope identifiers fall within a predefined list of scope identifiers (e.g., a list of scopes only associated with writing to a group-based communication channel of the requested group-based communication interface). Another example external request rule may be satisfied if an internal developer indicator represents that the developer of the external resource is an internal developer. In some embodiments, an external request rule may be satisfied based on a combination of factors in the request metadata set. For example, an example external request rule may be created to approve external resources associated with certain developers only for a subset of group-based communication interfaces, and may be determined based on a requested group-based communication interface identifier and external resource identifier.

If the request metadata set does not satisfy an external resource request rule in the external resource request rule set, flow continues to operation 706. At operation 706, flow returns to point B illustrated in FIG. 6. The process may then continue to block 608, and so on as described above.

If the request metadata set does satisfy an external resource request rule in the external resource request rule set, flow continues to decision 708. At decision 708, the apparatus 200 includes means, such as admin approval management module 210, processor 202, and/or the like, to determine the external resource request rule type of the satisfied external resource request rule. In some embodiments, an external resource request rule type may represent an automatic approval rule or an automatic rejection rule. For example, an automatic approval rule may indicate that, if the external resource request rule is satisfied, access for the external resource associated with the requested group-based communication interface should be automatically approved, for example using the procedures illustrated by blocks 710 and 712. An automatic rejection rule may indicate that, if the external resource request rule is satisfied, access for the external resource associated with the requested group-based communication interface should be automatically rejected, for example using the procedures illustrated by blocks 714, 716, and 718.

If the satisfied external resource request rule is an automatic approval rule, flow continues to optional block 709, the apparatus 200 includes means, such as the admin approval management module 210, processor 202, and/or the like, to obtain an admin response indication representing admin approval. For example, the apparatus may identify the admin response indication representing an admin approval based on the determination that the request metadata set satisfies an automatic approval external resource request rule. The admin response indication representing admin approval may be used to set the external resource permission status at block 710.

At block 710, the apparatus 200 includes means, such as the admin approval management module 210, repository management module 216, processor 202, and/or the like, to set an external resource permission status for the external resource associated with the group-based communication interface to an approved status. In some embodiments, the apparatus 200 may generate and/or update a record in a group-based communication repository, where the record is keyed and/or otherwise associated with a group-based communication interface identifier for the requested group-based communication interface and an external resource identifier associated with the external resource.

Upon setting the external resource permission status, one or more user accounts associated with one or more users may be notified and/or receive information regarding the set external resource permission status. In some embodiments, a user account indicated as the requesting user account associated with the external resource access request at an earlier block, for example block 602, may be notified regarding the external resource permission status. If the admin response indication represents an admin approval, the requesting user account may be notified the external resource was approved, and that the external resource may be provisioned and/or installed to the requested group-based communication interface upon request. Additionally or alternatively, one or more other user accounts that are members of, or otherwise associated with, the requested group-based communication interface may similarly be notified. For example, all user accounts that are members of the group-based communication interface may be notified, user accounts associated with roles may be notified, or another sub-group of user accounts may be notified.

At block 711, the apparatus 200 includes means, such as communications module 208, processor 202, and/or the like, or a combination thereof, to receive, from a client device, an external resource installation request associated with the external resource and the requested group-based communication interface. In some embodiments, the client device may be the same client device from which the external resource access request was received at an earlier block, for example block 602. In other embodiments, the client device may be a second client device controlled by the same or another user. For example, in some embodiments, a second user, via any of one or more client devices communicable with the apparatus 200, may transmit the external resource installation request.

The external resource installation request includes data configured to provision and/or otherwise install the external resource for access via the requested group-based communication interface. For example, a user associated with a user account permissioned to access the requested group-based communication interface may transmit the external resource installation request after the external resource has been approved by an administrator with respect to the requested group-based communication interface. In some embodiments, the external resource installation request includes at least an external resource identifier and a group-based communication interface identifier. Additionally or alternatively, the external resource installation request may include a requestor identifier.

The apparatus 200 may perform one or more steps for provisioning or otherwise installing the external resource for access via the requested group-based communication interface. Upon completion of the permissioning, provisioning, and/or installation process, the external resource is configured to access the requested group-based communication interface, and users may access functionality associated with the external resource from within the requested group-based communication interface. In some embodiments, for example, one or more of the operations described with respect to block 616 may define an example provisioning, and/or installation process.

At block 712, the flow continues to point C, illustrated in FIG. 8A, for generating, configuring, and otherwise managing various access tokens to provision and/or otherwise install the external resource for access via the requested group-based communication interface. The flow may continue in response to setting the external resource permission status, and in some embodiments in response to receiving a subsequent external resource installation request. The operations beginning at point C illustrated in FIG. 8A are discussed further below.

Returning to decision 708, if the satisfied external resource request rule is an automatic rejection rule, flow continues to optional block 713. At optional block 713, the apparatus 200 includes means, such as the admin approval management module 210, processor 202, and/or the like, to obtain an admin response indication representing admin rejection. For example, the apparatus may identify the admin response indication representing an admin rejection based on the determination that the request metadata set satisfies an automatic rejection external resource request rule. The admin response indication representing admin approval may be used to set the external resource permission status at block 714.

At block 714, the apparatus 200 includes means, such as admin approval management module 210, repository management module 216, processor 202, and/or the like, to set an external resource permission status for the external resource associated with the group-based communication interface to a rejected state. In some embodiments, the apparatus 200 may generate and/or update a record in a group-based communication repository, where the record is keyed and/or otherwise associated with a group-based communication interface identifier for the requested group-based communication interface and an external resource identifier associated with the external resource. In some embodiments, if the external resource permission status for the external resource associated with the group-based communication interface is set to a rejected state, only admin accounts may be enabled to perform and/or further permissioning and/or provisioning of the external resource for accessing the requested group-based communication interface.

At block 716, the apparatus 200 includes means, such as admin approval management module 210, communications module 208, processor 202, and/or the like, to transmit a resource access rejection to the client device. The apparatus 200 may generate the resource access rejection. In some embodiments, the resource access rejection includes at least the external resource that was rejected (e.g., the external resource name), an admin account information associated with the admin account that created the external resource request rule, information regarding the external resource request rule, and/or the like. Additionally or alternatively, in some embodiments, the resource access rejection may include a rejection message, such as a string of text, providing contact information for one or more admin accounts associated with the organization identifier and/or requested group-based communication interface.

At optional block 718, the apparatus 200 includes means, such as admin approval management module 210, communications module 208, processor 202, and/or the like, to transmit a resource access rejection to the admin device. In some embodiments, the resource access rejection may include a text string message indicating the external resource was rejected. Additionally or alternatively, the resource access rejection may include the request metadata set, and/or particular information thereof. For example, in some embodiments, the resource access rejection may include an external resource identifier, a requesting user account identifier, a developer identifier, a scope identifier set, and/or a combination thereof. The resource access rejection may function to inform an administrator user associated with an admin device that access of the external resource has been rejected automatically, notifying the administrator and enabling the administrator to take appropriate corresponding action (e.g., leave the external resource rejected, approve the external resource, add, delete, and/or change one or more external resource request rules in the external resource request rule set, or the like.

Turning to FIG. 8A, which broadly illustrates operations for facilitating access to a requested group-based communication interface by generating, configuring, and otherwise managing various access tokens, in accordance with example embodiments described herein At block 802, the apparatus 200 includes means, such as the access token management module 212, repository management module 216, processor 202, and/or the like, to obtain a multi-interface access token associated with an external resource. For example, the external resource may be associated with an earlier received external resource access request, such as an external resource access request. The external resource may be associated with an external resource identifier.

In some embodiments, the apparatus 200 may query a group-based communication repository based on the external resource identifier to retrieve an existing multi-interface access token. If the group-based communication repository includes a multi-interface access token associated with the external resource identifier, the group-based communication repository may return result data including the multi-interface access token. For example, the apparatus may have stored a multi-interface access token in response to enabling access for the external resource to another group-based communication interface.

Alternatively, if the apparatus 200 cannot retrieve the multi-interface access token (e.g., the result data returned from querying the group-based communication repository is empty), then the apparatus 200 may be configured to generate the multi-interface access token. The multi-interface access token may be generated using one or more known token generation algorithms. After generating the multi-interface access token, the multi-interface access token may be transmitted to the external resource for storage and future use.

At block 804, the apparatus 200 includes means, such as the access token management module 212, repository management module 216, processor 202, and/or the like, to generate a single-interface access token associated with the requested group-based communication interface. The single-interface access token may be utilized to access the requested group-based communication interface, and provide information associated with the requested group-based communication interface to the external resource.

In some embodiments, the single-interface access token is generated using one or more known token generation algorithms. In some embodiments, the single-interface access token may be generated based on at least the multi-interface access token. Additionally or alternatively, the single-interface access token may be generated based at least on at least the requested group-based communication interface and/or external resource. Additionally or alternatively, the single-interface interface token may be generated based at least on a portion of a request metadata set. For example, if a requested access scope is identified, the single-interface access token may be configured based on the approved access scope, such that single-interface access token may only be used for services that are permitted by the approved access scope.

At block 806, the apparatus 200 includes means, such as the access token management module 212, repository management module 216, processor 202, and/or the like, to store the single-interface access token associated with the requested group-based communication interface and the multi-interface access token. For example, in some embodiments, the single-interface access token may be stored based on the group-based communication interface identifier associated with the requested group-based communication interface (e.g., a requested group-based communication interface identifier associated with the requested group-based communication interface) and associated with the multi-interface access token in a group-based communication repository.

In some embodiments, for example, the apparatus 200 may store the single-interface access token in a group-based communication repository, for example via a relation. The single-interface access token may be mapped to only one multi-interface access token, while the multi-interface access token may be mapped to many single-interface access tokens. Thus, the apparatus 200 may retrieve a specific single-interface access token from the group-based communication repository based on a group-based communication interface identifier for the requested group-based communication interface, and the multi-interface access token associated with the external resource.

At block 808, flow for the process continues. For example, if point C was reached at block 616 in FIG. 6, flow may subsequently continue to block 818. Similarly, if point C was reached at block 712, flow may subsequently end (as illustrated in FIG. 7).

8B broadly illustrate operations for facilitating access to one or more additional group-based communication interfaces by generating, configuring, and otherwise managing various access tokens, in accordance with example embodiments described herein.

At block 852, the apparatus 200 includes means, such as the access token management module 212, repository management module 216, processor 202, and/or the like, to obtain a multi-interface access token associated with an external resource. For example, the external resource may be associated with an earlier received external resource access request, such as an external resource access request. The external resource may be associated with an external resource identifier.

In some embodiments, the apparatus 200 may query a group-based communication repository based on the external resource identifier to retrieve an existing multi-interface access token. If the group-based communication repository includes a multi-interface access token associated with the external resource identifier, the group-based communication repository may return result data including the multi-interface access token. For example, the apparatus may have stored a multi-interface access token in response to enabling access for the external resource to another group-based communication interface.

Alternatively, if the apparatus 200 cannot retrieve the multi-interface access token (e.g., the result data returned from querying the group-based communication repository is empty), then the apparatus 200 may be configured to generate the multi-interface access token. The multi-interface access token may be generated using one or more known token generation algorithms. After generating the multi-interface access token, the multi-interface access token may be transmitted to the external resource for storage and future use.

At block 854, the apparatus 200 includes means, such as admin approval management module 210, processor 202, and/or the like, to identify an additional group-based communication interface based on an additional admin approval included in the admin response transmission. In some embodiments, the admin response transmission may include at least one additional admin approval, and may include or otherwise indicate a group-based communication interface identifier for an additional group-based communication interface associated with the additional admin approval. In some embodiments, the admin response transmission includes an additional admin approval set including at least one additional admin approval and an associated group-based communication interface identifier. In some embodiments, the apparatus 200 may parse and/or extract the group-based communication interface identifier from the admin response transmission to identify the additional group-based communication interface.

At block 856, the apparatus 200 includes means, such as the access token management module 212, repository management module 216, processor 202, and/or the like, to generate an additional single-interface access token associated with the additional group-based communication interface. The single-interface access token may be utilized to access the additional group-based communication interface, and provide information associated with the additional group-based communication interface to the external resource.

In some embodiments, the single-interface access token is generated using one or more known token generation algorithms. In some embodiments, the single-interface access token may be generated based on at least the multi-interface access token. Additionally or alternatively, the single-interface access token may be generated based at least on at least the additional group-based communication interface and/or external resource.

At block 858, the apparatus 200 includes means, such as the access token management module 212, repository management module 216, processor 202, and/or the like, to store the additional single-interface access token associated with the additional group-based communication interface and the multi-interface access token. For example, in some embodiments, the single-interface access token may be stored based on the additional group-based communication interface identifier associated with the additional group-based communication interface and associated with the multi-interface access token in a group-based communication repository.

In some embodiments, for example, the apparatus 200 may store the additional single-interface access token in a group-based communication repository, for example via a relation. The single-interface access token may be mapped to only one multi-interface access token, while the multi-interface access token may be mapped to many single-interface access tokens. For example, the multi-interface access token may be associated with a single-interface access token for each group-based communication interface for which the external resource corresponding to the multi-interface access token is permissioned to access. Thus, the apparatus 200 may retrieve a specific single-interface access token from the group-based communication repository based on a group-based communication interface identifier for the additional group-based communication interface, and the multi-interface access token associated with the external resource.

At decision 860, the apparatus 200 includes means, such as admin approval management module 210, processor 202, and/or the like, to determine if each additional admin approval in the admin response transmission has been iterated through. If, for example, the apparatus 200 determines that not all additional admin approvals have been iterated through, flow returns to 854 for provisioning the next additional group-based communication interface approved by the admin. The blocks 854-860 may be repeated for each additional admin approval received.

If, at decision 860, the apparatus 200 determines that each additional admin approval has been iterated through, flow continues to block 862. At block 862, flow for the process continues. For example, if point D was reached at block 622, flow may return to block 622 and subsequently end.

Example Operations for Accessing a Group-Based Communication Interface by an External Resource Having described example operations for permissioning and provisioning of an external resource associated with accessing one or more group-based communication interface, the external resource may subsequently access information associated with a permissioned and provisioned group-based communication interface. FIG. 9 broadly illustrates a flowchart containing a series of operations performed by a group-based communication system for accessing a group-based communication interface, by an external resource via a group-based communication system, in accordance with example embodiments described herein. The operations illustrated in FIG. 9 may be performed by a group-based communication system 102, with the assistance of, and/or under the control of, an apparatus 200.

At block 902, the apparatus 200 includes means, such as external resource management module 214, communications module 208, processor 202, and/or the like, to receive an interface access request from an external resource. The interface access request may be associated with a requested group-based communication interface having a requested group-based communication interface identifier. The requested group-based communication interface may represent the group-based communication interface to be accessed by the external resource (e.g., a group-based communication interface the external resource wishes to read data from and/or write data to).

In some embodiments, the interface access request includes additional information. For example, the interface access request may additionally include a multi-interface access token stored by the external resource after a permissioning and/or provisioning process. Additionally, in some embodiments, the interface access request includes one or more requested scopes.

At block 904, the apparatus 200 includes means, such as external resource management module 214, repository management module 216, processor 202, and/or the like, to retrieve a single-interface access token from a group-based communication repository based on (1) the requested group-based communication interface identifier and (2) the multi-interface access token. In some embodiments, the apparatus 200 may first retrieve an external resource permission status associated with an external resource identifier for the external resource associated that transmitted the interface access request to determine if the external resource has been approved. If the external resource permission status associated with the external resource identifier is not an approval status, an access error response may be provided, and the flow may end. In some embodiments, the apparatus 200 may query the group-based communication repository based on (1) the requested group-based communication interface identifier and (2) the multi-interface access token. Additionally, in some embodiments, the apparatus 200 may query the group-based communication repository based on an external resource identifier associated with the external resource.

In some embodiments, a single-interface access token is stored based on at least the requested group-based communication interface identifier and the multi-interface access token, such that the requested group-based communication interface identifier and the multi-interface access token form a key for retrieving the single-interface access token. For example, where a single-interface access token exists in response to a prior permissioning and/or provisioning by the apparatus 200, the group-based communication repository may return result data including the single-interface access token in response to the query.

At decision 906, the apparatus 200 includes means, such as external resource management module 214, repository management module 216, processor 202, and/or the like, to determine whether the single-interface access token exists associated with (1) the requested group-based communication interface identifier and (2) the multi-interface access token. In some embodiments, the apparatus 200 performs the query and checks the result data returned. If the result data includes a single-interface access token, the external resource has been permissioned and/or provisioned to access the requested group-based communication interface, and flow continues to block 908.

At block 908, the apparatus 200 includes means, such as external resource management module 214, processor 202, and/or the like, to access the requested group-based communication interface utilizing the single-interface access token. In some embodiments, the group-based communication interface may determine if the single-interface access token is associated with requested scopes. In some embodiments, if the single-interface access token is not associated with the requested scopes (e.g., the external resource is permissioned and/or provisioned only to access more limited scopes), the apparatus may transmit an access error response to the external resource indicating the external resource is not permissioned and/or provisioned to access the requested scopes.

Otherwise, the single-interface access token may be configured to access the requested group-based communication interface via one or more APIs. The one or more APIs may be managed by the group-based communication system embodied by the apparatus 200, and utilized for providing functionality to a group-based communication interface by reading and/or writing data to the group-based communication interface. A requested group-based communication interface may be accessed in a myriad of ways, depending on the requested scopes of the interface access request. For example, the requested group-based communication interface may be accessed to post specific data to a group-based communication channel within the requested group-based communication interface. In an example embodiment, the group-based communication system may generate an external resource service communication based on some or all of the information received in the interface access request. For example, the interface access request may include a document, data, or other information retrieved and provided by the external resource.

In another example, the requested group-based communication interface may be accessed to read files associated with the requested group-based communication interface. In some embodiments, the requested group-based communication interface is accessed by querying data associated with the requested group-based communication interface from a group-based communication repository, or storing data associated with the requested group-based communication interface in the group-based communication repository.

At block 910, the apparatus 200 includes means, such as external resource management module 214, processor 202, and/or the like, to generate an access response in response to accessing the requested group-based communication interface. In some embodiments, the access response may include the data retrieved associated with the requested group-based communication interface. Additionally or alternatively, the access response may include information indicating whether provided data was successfully stored associated with the requested group-based communication interface (e.g., whether a group-based communication was posted to a group-based communication channel of the requested group-based communication interface, and/or confirmation information associated with this action).

At block 912, the apparatus 200 includes means, such as external resource management module 214, communications module 208, processor 202, and/or the like, to transmit the access response to the external resource. In some embodiments, the access response may be transmitted in response to the interface access request received at block 902. It should be appreciated that, the apparatus 200 may retrieve, determine, or otherwise identify external resource identification information for transmitting the access response (e.g., an IP address, or the like associated, with the external resource identifier). The external resource identification information may be retrieved from a group-based communication repository, or parsed and/or extracted from the interface access request.

Returning to decision 906 the result data does not include a single-interface access token, the external resource has not been permissioned and/or provisioned to access the requested group-based communication interface, and flow continues to block 914. At block 914, the apparatus 200 includes means, such as external resource management module 214, communications module 208, processor 202, and/or the like, to transmit an access error response to the external resource. In some embodiments, the access error response may include an error message identifying that the external resource is not permissioned and/or provisioned to access the requested group-based communication interface. The apparatus 200 may generate the access error response for transmitting.

FIG. 10A illustrates a data flow diagram that contains operational steps for managing admin-controlled access of external resources to group-based communication interfaces via the group-based communication system, in accordance with example embodiments of the present disclosure. Operations in FIG. 10A may, for example, be performed by a system comprising a client device 1001, a group-based communication system 1003 (which may be embodied by an apparatus such as apparatus 200), admin device 1005, and external resource 1007. The client device 1001, group-based communication system 1003, admin device 1005, and external resource 1007 may be configured to communicate with one another via a network (not depicted). Each of the client device 1001 and admin device 1005 may communicate with the external resource 1007 via the group-based communication system 1003.

At step 1002, the user executes a software application associated with the group-based communication system 1003 on the client device 1001. The software application may be a native software application, executable, or browser application for communicating with the group-based communication system 1003. The software application may communicate with the group-based communication system 1003 through a client access API managed by the group-based communication system 1003 and made available to the client device. The user of the client device 1001 may complete an authentication process associated with a user account (such as by providing a valid username and password combination associated with a user account), and begin an authenticated session associated with the user account. During the authentication session, the user may access one or more group-based communication interfaces associated with, or otherwise accessible to, the user account for the authenticated session. For example, the user may select a requested group-based communication interface accessible to the user account, and the client device 1001 may render the requested group-based communication interface.

At step 1004, the user may engage an interface element to request access to an external resource within the requested group-based communication interface. For example, the requested group-based communication interface may include, or be associated with, an external resource browser such that users may request new external resources be permissioned to access information associated with, and provide functionality via, the requested group-based communication interface. The interface element to request access may be a button that may be engaged by the user to request access associated with a corresponding external resource.

At step 1006, the group-based communication system 1003 may receive an external resource access request including an external resource identifier and a requested group-based communication interface identifier. In some embodiments, the external access request may additionally include a user account identifier associated with the user account requesting access for the external resource. The external resource access request may be received over a network connecting the group-based communication system 1003 and client device 1001.

To track the external resource permission status of the external resource having the external resource identifier, the group-based communication system may maintain one or more external resource access records for the external resource identifier and associated with the requested group-based communication interface identifier. The group-based communication system 1003 may generate the external resource access record associated with the requested group-based communication interface identifier and the external resource identifier, and store the external resource access record in a repository, such as a group-based communication repository. The external resource access record includes an external resource permission status for the external resource associated with the requested group-based communication interface identifier. The group-based communication system 1003 may set the permission status in the external resource access record to a pending and/or requested status.

At step 1008, the group-based communication system 1003 may determine an organization identifier associated with the requested group-based communication interface identifier. In some embodiments, the group-based communication system 1003 may maintain a mapping between group-based communication identifiers and organization identifiers. For example, the group-based communication system 1003 may query a group-based communication system repository for the organization identifier associated with the requested group-based communication interface identifier, and receive the organization identifier as response data.

At step 1010, an administrator user may execute an admin software application associated the group-based communication system 1003 on an admin device 1005. The admin software application may be a native software application, executable, or browser application for communicating with the group-based communication system 1003. The admin software application may communicate with the group-based communication system 1003 through an admin management API made available by the group-based communication system 1003 to the client device. The administrator user of the admin device 1005 may complete an authentication process associated with an admin account (such as by providing a valid username and password combination associated with an admin account), and begin an authenticated session associated with the admin account. During the authenticated session, the administrator user may perform various administrative management tasks, as described herein, for managing an organization data object and/or associated organization-linked group-based communication interfaces. It should be appreciated that the step 1010 may occur before, concurrently with, or after step 1008.

At step 1012, the group-based communication system 1003 may transmit an admin approval request to the admin device 1005 to cause rendering of an administrative management interface associated with the organization identifier. The administrative management interface may include, at least, an interface element configured to receive user input from an administrator user in response to the external resource access request. In some embodiments, the administrative management interface is rendered once the administrator user begins an authenticated session associated with the admin account associated with the organization identifier. The group-based communication system 1003 may receive various external resource access requests before an administrator user begins an authenticated session at step 1010. The group-based communication system 1003 may store pending external resource access requests until they have been responded to, for example in a group-based communication repository.

The administrative management interface may include various information associated with the organization data object or associated organization-linked group-based communication interfaces. For example, in some embodiments, the group-based communication system 1003 may identify all organization-linked group-based communication interfaces associated with the organization identifier determined at step 1008. The group-based communication system 1003 may render the administrative management interface including an interface component associated with each of the organization-linked group-based communication interfaces, such that the administrator user may visualize each organization-linked group-based communication interface.

Additionally or alternatively, the group-based communication system 1003 may further identify all pending external resource access requests associated with each of the organization-linked group-based communication interfaces. For example, the group-based communication system may identify each pending external resource access request associated with a requested group-based communication interface identifier that corresponds to one of the identified organization-linked group-based communication interfaces. The group-based communication system 1003 may render the administrative management interface further including an interface component for accepting each of the pending external resource access requests. For example, in some embodiments, each pending external resource access request is rendered corresponding to an approval component and a rejection component configured to receive user engagement.

Additionally or alternatively, the group-based communication system 1003 may further identify all external resources currently permissioned to access each of the organization-linked group-based communication interfaces. For example, the group-based communication system 1003 may query a repository, such as a group-based communication repository, for the permission status for all external resources associated with each organization-linked group-based communication interface having an approved status, and receive the external resource identifiers of such external resources as result data. The administrative management interface may be rendered such that an interface component associated with an organization-linked group-based communication interface is connected to an interface component associated with each approved external resource having access to that organization-linked group-based communication interface. In this regard, the administrator user may visualize what external resources are permissioned to access certain group-based communication interfaces. In some embodiments, the administrative management interface may additionally be configured to revoke permissions granted to an external resource for accessing one or more of the organization-linked group-based communication interfaces.

The admin approval request may include all information necessary for rendering the administrative management interface, and/or updating a previously rendered administrative management interface, to include at least the external resource access request received at step 1006. For example, the admin approval request may include (1) a group-based communication interface identifier (and/or other information associated with each group-based communication interface, such as the group-based communication interface name, topic, icon, or the like) associated with each organization-linked group-based communication interface corresponding to the organization identifier determined at step 1006, (2) each pending external resource access request, and (3) a set of external resource identifiers (and/or other information associated with each external resource, such as the external resource name, developer name, scope permissions, or the like). In some embodiments, the group-based communication system may generate the admin approval request including the information for rendering the administrative management interface.

At step 1014, the admin device 1005 renders the administrative management interface for managing external resource access a plurality of organization-linked group-based communication interfaces. For example, the group-based communication system 1003 may cause the admin device 1005 to render the administrative management interface based on the information included in the admin approval request. The administrative management interface may include at least interface components for responding to the external resource access request received at step 1006.

Additionally or alternatively, in some embodiments, the administrative management interface may be configured to enable an administrator to respond to an external resource access request for the requested group-based communication interface, and additionally for one or more of the organization-linked group-based communication interfaces corresponding to the organization identifier for the requested group-based communication interface. For example, the administrative management interface may be rendered such that, when responding to an external resource access request, the request may be additionally approved for accessing one or more of the organization-linked group-based communication interfaces. The organization-linked group-based communication interfaces that receive additional approval may be selected by the administrator user via the administrative management interface, and all submitted via a single admin response transmission upon submission, or otherwise upon saving, of the selections by the administrator user.

Additionally or alternatively, in some embodiments, the administrative management interface may be configured to enable the administrative user to create, delete, and/or edit an external resource request rule set associated with the organization identifier. For example, in some embodiments, the administrative management interface may include an interface component for generating a new external resource request rule. The external resource request rule may be an automatic approval rule for automatically approving external resource access requests based on the request metadata set associated with the external resource access request, or an automatic rejection rule for automatically rejecting external resource access requests based on the request metadata set associated with the external resource access request. The interface component may be configured to receive input from the administrator user for satisfying the rule based on certain values of the request metadata set. For example, the administrator user may input a scope set associated with an automatic approval rule, such that external resource requests associated with external resources that only require access to the scopes identified by the administrator user are automatically approved. Similarly, the administrator user may input a second scope set associated with an automatic rejection rule, such that external resource requests associated with external resources that require access to one of the scopes identified in by the administrator user are automatically rejected.

At step 1016, the administrator user engages the administrative management interface to input an admin response for the admin approval request. For example, the admin response may be based on engagement with an interface component for approving and/or rejecting the external resource access request received at step 1006. The admin device 1005 may transmit an admin response transmission to the group-based communication system 1003 including at least an admin response indication associated with the external resource access request received at step 1006. In some embodiments, the admin response transmission may additionally include at least one additional admin approval or admin rejection associated with the access of the external resource to one or more organization-linked group-based communication interfaces. Additionally or alternatively, the admin response transmission may include a new and/or updated external resource request rule set associated with the organization identifier.

At step 1018, the group-based communication system 1003 receives the admin response transmission including at least the admin response indication associated with external resource access request. The admin response transmission may further include information that identifies the admin response indication is associated with the external resource identifier and the requested group-based communication interface identifier. The admin response transmission may be received from the admin device 1005 via an admin management API managed by the group-based communication system 1003.

At step 1020, the group-based communication system 1003 may set an external resource permission status for the external resource identifier associated with at least the requested group-based communication interface identifier. The permission status may be set based on the admin response indication. For example if the admin response indication is an admin approval, the permission status may be set to an approved status. If the admin response indication is an admin rejection, the permission status may be set to a rejected status.

The group-based communication system 1003 may retrieve, from a group-based communication repository, an external resource access record associated with the requested group-based communication interface identifier and the external resource identifier. The external resource access record may include an external resource permission status for the external resource associated with the requested group-based communication interface identifier. The group-based communication system 1003 may set the permission status in the external resource access record, and store the external resource access record with the newly set external resource permission status.

The group-based communication system 1003 may additionally set one or more external resource permission status(es) for the external resource associated with one or more organization-linked group-based communication interface identifier(s) based on one or more additional admin response indications received as part of the admin response transmission. For example, the admin response transmission may include an additional approval set indicating the administrator user additionally approved the external resource to access one or more organization-linked group-based communication interfaces. Each additional approval may be paired with the resource identifier and an organization-linked group-based communication interface identifier associated with the additionally approved group-based communication interface. An external resource access record may be retrieved and/or generated based on the external resource identifier and the organization-linked group-based communication interface identifier for the additionally approved group-based communication interface, such that the corresponding external resource permission status may be set based on the additional approval.

In some embodiments, an additional rejection set may also be received. The same process may be performed for identifying and retrieving external resource access record(s) for the additionally rejected group-based communication interfaces. For each of the retrieved external resource access records associated with the additional rejection set, the external resource permission status may be set to a rejected status.

At step 1021, the user selects to install the external resource to the requested group-based communication interface. In some embodiments, a notification received associated with the external resource permission status set at an earlier step may include an interface component configured to, in response to user engagement, select the external resource for installation to the requested group-based communication interface. In other embodiments, the user may access and/or otherwise navigate an application, interface, or the like for selecting the external resource from a plurality of external resources to install to the requested group-based communication interface. For example, in some embodiments, the user may, from within the group-based communication interface and/or associated with a particular group-based communication interface, access an interface configured for requesting approval of one or more external resource(s) and installing approved, or pre-approved, external resource(s), such as an external resource library and/or application store maintained and/or controlled by the group-based communication system 1003. The external resource library may display information associated with a plurality of external resources, where the user may request approval of external resources for which admin approval has not yet been requested with respect to the requested group-based communication interface, and install external resources that are associated with an approved status or a pre-approved status. In some embodiments, the group-based communication system 1003 may query a database, or repository, to identify external resources having an approved status or pre-approved status with respect to the particular group-based communication interface. The external resource library, application store, or similar interface may then be configured based on the external resource approval statuses for the various external resources to enable selection of approved or pre-approved external resources for installing to the requested group-based communication interface.

At step 1022, the client device 1001 transmits an external resource installation request. In some embodiments, the client device 1001 generates and/or configures the external resource installation request for transmission to the group-based communication system 1003. The external resource installation request may include, at least, a requested group-based communication interface identifier for the requested group-based communication interface, an external resource identifier associated with the external resource to be per-missioned, provisioned, and/or installed to the requested group-based communication interface. The external resource installation request may include information for indicating the external resource should be made accessible from within the requested group-based communication interface.

At step 1023, the group-based communication system 1003 may obtain and/or provision a multi-interface access token associated with the external resource identifier for the external resource, and obtain and/or provision a single-interface access token for each approved group-based communication interfaces. In some embodiments, the step 1023 is only performed if the external resource is admin approval is received associated with at least one group-based communication interface.

In some embodiments, where the external resource has not been approved to access any other group-based communication interface, the group-based communication system 1003 may generate the multi-interface access token for the external resource associated with the external resource identifier. The multi-interface access token may be stored by the external resource 1007 and used to communicate with the group-based communication system 1003, for example via an interface access API managed by the group-based communication system 1003.

In some embodiments, alternatively, a multi-interface access token may be retrieved for the external resource identifier. For example, the multi-interface access token may be retrieved, from a group-based communication repository, associated with the external resource identifier. The multi-interface access token may be retrieved when the external resource 1007 has already been approved to access at least one group-based communication interface.

The multi-interface access token may be associated with various single-interface access tokens for accessing various group-based communication interfaces. The group-based communication system 1003, for example, may store a mapping between a particular multi-interface access token and one or more associated single-interface access tokens in a group-based communication repository. Each single-interface access token may be utilized to access a particular group-based communication interface having a particular group-based communication interface identifier. The group-based communication system 1003 may maintain the mapping between the multi-interface access token, and the single-interface access tokens for accessing particular group-based communication interfaces, such that the external resource 1007 need only control a single token rather than a token per approved group-based communication interface.

In this regard, the group-based communication system 1003 may generate a single-interface access token associated with the requested group-based communication interface identifier. The single-interface access token may be associated with accessing specifically the requested group-based communication interface having the requested group-based communication interface identifier. Additionally, based on the additional approval set received as part of the admin response transmission, the group-based communication system 1003 may, for each additional admin approval in the additional approval set, generate a single-interface access token associated with an additional approved organization-linked group-based communication interface identifier. Each generated single-interface access token may be associated with the external resource identifier such that the single-interface access token may be used to access the organization-linked group-based communication interface associated with the additional approved organization-linked group-based communication interface identifier.

The group-based communication system 1003 may additionally associate each generated single-interface access token with the multi-interface access token for the external resource. For example, the group-based communication system 1003 may store the single-interface access token in a group-based communication repository such that the single interface-access token may be retrieved using the multi-interface access token and a corresponding group-based communication interface identifier. For example, a newly generated single-interface access token may be generated associated with enabling a particular external resource, associated with a particular multi-interface access token, to access a particular organization-linked group-based communication interface having a particular group-based communication interface identifier. The newly generated single-interface access token may be associated with the particular multi-interface access token by storing the newly generated single-interface access token such that the newly generated single-interface access token is retrievable using (1) the particular multi-interface access token associated with the particular external resource identifier and (2) the particular group-based communication interface identifier for the group-based communication interface that may be accessed using the newly generated single-interface access token.

At step 1024, the group-based communication system 1003 may transmit access token information to the external resource 1007. The access token information, in some embodiments, includes the multi-interface access token and/or group-based communication interface identifier set associated with group-based communication interfaces having an approved status associated with the external resource. In other embodiments, the access token information includes the one or more generated single-interface access tokens. In some embodiments where the access token information includes the one or more single-interface access tokens, the external resource 1007 may manage the storage of each single-interface access tokens, such that multi-interface access tokens need not be used.

At step 1026, the external resource 1007 receives the access token information. At step 1028, the external resource 1007 stores the access token information. In some embodiments, the external resource 1007 stores at least a multi-interface access token. The external resource may additionally store an approved group-based communication interface identifier set, such that the external resource may request access to a group-based communication interface using the multi-interface access token and an approved group-based communication interface identifier. In other embodiments, the external resource may receive and store one or more single-interface access tokens. Each single-interface access token may be stored associated with a corresponding group-based communication interface identifier for a corresponding group-based communication interface that the single-interface access token may be used to access.

After receiving admin approval for an external resource to access one or more group-based communication interfaces, and provisioning the external resource for accessing the one or more approved group-based communication interfaces, the flow may continue to block A in FIG. 10B.

FIG. 10B illustrates a data flow diagram that contains operational steps for accessing a group-based communication interface, by an external resource via a group-based communication system, in accordance with example embodiments of the present disclosure. Operations in FIG. 10B may, for example, be performed by a system comprising a client device 1001, a group-based communication system 1003 (which may be embodied by an apparatus such as apparatus 200), and external resource 1007. The client device 1001, group-based communication system 1003, and external resource 1007 may be configured to communicate with one another via a network (not depicted). The client device 1001 may communicate with the external resource 1007 via the group-based communication system 1003.

At step 1050, the group-based communication system 1003 causes updated rendering of the requested group-based communication interface to include an external resource access component. The group-based communication system 1003 may, for example, forward information associated with the external resource for which an admin approval was received, and/or the permission status for the external resource. The transmission from the group-based communication system 1003 may be configured to cause the group-based communication system to be rendered including the external resource access component.

In some embodiments, the group-based communication system 1003 may cause updated rendering by generating and/or providing for rendering a new group-based communication channel associated with the external resource. For example, the group-based communication channel may be specifically configured for enabling users to access, via the requested group-based communication interface, services associated with the external resource. In some embodiments, multiple group-based communication channels and/or group-based communications may be generated and caused to be rendered by a client device, such as client device 1001.

At step 1052, the client device 1001 renders the updated requested group-based communication interface. For example, in some embodiments the client device 1001 may be caused to update rendering of the requested group-based communication interface to include the external resource access component. The updated requested group-based communication interface may be rendered via the software application executed on the client device 1001. For example, the software application may update the requested group-based communication interface in response to receiving information from the group-based communication system 1003.

At step 1054, the user engages with the group-based communication interface to request services from the external resource within the requested group-based communication interface. The user may, for example, via the client device 1001, engage the external resource access component to request services associated with the external resource 1007. The external services may provide services through communication with the group-based communication system 1003, for example to update the requested group-based communication interface upon access by the external resource 1007. In response to the request for services, the client device 1001 may transmit an external resource service request to the group-based communication system 1003.

At step 1056, the group-based communication system 1003 may receive the external resource service request including the external resource identifier and the requested group-based communication interface identifier. Additionally, the external resource service request may include a services indicator representing the services requested from the external resource. In some embodiments, the external resource service request may include a user identifier associated with the user account accessing the client device 1001.

At step 1058, the group-based communication system 1003 may identify an external resource access token based on the external resource identifier. In some embodiments, the group-based communication system 1003 may retrieve the external resource access token based on the external resource identifier. In some embodiments, the external resource access token may additionally be retrieved based on a requesting user identifier. The external resource access token may enable the group-based communication system 1003 to communicate with the external resource 1007, for example via an external resource access API associated with the external resource 1007.

At step 1060, the group-based communication system 1003 may transmit a service performance request to the external resource 1007. The service performance request may include the external resource access token and the requested group-based communication interface identifier. In some embodiments, the service performance request may additionally include the external resource access token. The service performance request may be transmitted to the external resource 1007 via an external resource access API managed by the external resource 1007.

At step 1062, the external resource 1007 may receive the service performance request. The external resource 1007 may receive the service performance request via an external resource access API managed by the external resource 1007. The service performance request may parse or otherwise identify the external resource access token from the service performance request.

At step 1064, the external resource 1007 may validate the external resource access token and perform the services requested. In some embodiments, the external resource 1007 may validate the external resource access token is validly associated with the group-based communication system 1003, and/or not expired. The services performed by the external resource 1007 may be based on the services requested by the user. For example, the service performance request may include the services indicator included in the external resource service request, which identifies the services to be performed.

At step 1066, the external resource 1007 may retrieve the multi-interface access token for the external resource 1007. In some embodiments, the external resource 1007 may store the multi-interface access token in a repository, and retrieve the multi-interface access token from the repository for transmitting to the group-based communication system.

At step 1068, the external resource 1007 may transmit an interface access request including the multi-interface access token. The interface access request may be associated with accessing information from the requested group-based communication interface, and/or posting information, such as group-based communications, to the group-based communication interface. In some embodiments, the interface access request may additionally include the requested group-based communication identifier, as determined by the external resource 1007 and/or forwarded via the received service performance request.

At step 1070, the group-based communication system 1003 may receive the interface access request from the external resource 1007. The interface access request may be received via an interface access API managed by the group-based communication system 1003. The external resource 1007 may be configured to communicate with the group-based communication system 1003 via the interface access API. In some embodiments, the interface access request may be associated with a requested access scope. For example, the interface access request may include a requested access scope, or otherwise be associated with an identifier and/or other information for identifying an associated requested access scope.

At step 1072, the group-based communication system 1003 may retrieve a single-interface access token associated with the multi-interface access token and requested group-based communication interface identifier. For example, the single-interface access token may be retrieved from a group-based communication repository using the multi-interface access token and requested group-based communication interface identifier. The requested group-based communication interface identifier may be extracted from the received interface access request. In other embodiments, the requested group-based communication interface identifier may be stored and determined from one of the previous steps. The retrieved single-interface access token may be configured for accessing the requested group-based communication interface.

At step 1074, the group-based communication system 1003 may access the requested group-based communication interface using the single-interface access token. In some embodiments, the group-based communication system may update information associated with the requested group-based communication interface. For example, based on the interface access request, the group-based communication system 1003 may access the requested group-based communication interface to post one or more group-based communications associated with the services performed by the external resource 1007.

For example, the group-based communication system may generate an external resource service communication based on some or all of the information received in the interface access request. The interface access request may include a document, data, or other information retrieved and provided by the external resource. The external resource service communication may include the provided document, data, or other information. The external resource service communication may be posted to a particular group-based communication channel, for example a group-based communication channel associated with the external resource. To enable the external resource service communication to be accessible to a user, the external resource service communication may be stored in a repository managed by the group-based communication system.

In some embodiments, the group-based communication system 1003 may first identify an approved access scope associated with the single-interface access token. In some embodiments, the single-interface access token may include the approved access scope, or multiple approved access scopes, in an encrypted or unencrypted format. In other embodiments, the approved access scope(s) may be identified via retrieval from a database, or other repository, based on the single-interface access token. For example, the approved access scopes may be retrieved with the single interface access token, such as at step 1072. The group-based communication system 1003 may then determine whether a requested access scope associated with the interface access request satisfies the approved access scope. If the requested access scope does satisfy, the flow may continue. If the requested access scope does not satisfy, the interface access request may be rejected, and an error message transmitted in response.

At step 1076, the group-based communication system 1003 may optionally transmit an access response to the external resource 1007. The access response may include information identifying whether the requested group-based communication interface was successfully accessed. Additionally or alternatively, the access response may include the information posted to the requested group-based communication interface, or equivalent information. At step 1078, the external resource 1007 receives the access response. The external resource 1007 may receive the access response via the external resource access API, such as in response to the interface access request transmitted at step 1068.

At step 1080, the group-based communication system 1003 may cause updated rendering of the requested group-based communication interface based on the accessed group-based communication interface. For example, the group-based communication interface may be updated to include one or more group-based communications posted in response to accessing the requested group-based communication interface. The group-based communication system 1003 may cause updated rendering by forwarding the posted information to client device for rendering to the requested group-based communication interface.

At step 1082, the client device 1001 may render updates to the requested group-based communication interface. The updates to the requested group-based communication based on the information received from the group-based communication system 1003. For example, the requested group-based communication system may render newly posted group-based communications. The group-based communications may be rendered to one or more group-based communication channels associated with the external resource 1007.

It should be appreciated that, in some embodiments, some or all of the steps depicted may be repeated. The group-based communication system 1003 may, in some embodiments, similarly receive subsequent external resource service requests and interface access requests. The group-based communication system 1003 may, for example, receive a second interface access request, comprising the same multi-interface access token but associated with a second requested group-based communication interface. The group-based communication system 1003 may then retrieve a second single-interface access token associated with the second requested group-based communication interface identifier, and access the second requested group-based communication interface based on the second single-interface access token.

In other embodiments, the group-based communication system may receive a subsequent external resource service request including a second external resource identifier and associated with either the same requested group-based communication interface or a second requested group-based communication interface, and transmit a corresponding service performance request to the second external resource. In response the group-based communication system 1003 may receive a second interface access request comprising a second multi-interface access token. The group-based communication system 1003 may utilize the second multi-interface access token to retrieve a second single-interface access token associated with the multi-interface access token and the requested group-based communication interface identifier. The second single-interface access token may then be utilized to access the requested group-based communication interface. In this regard, the improved group-based communication system enables an external resource to access approved group-based communication interfaces while managing only a single multi-interface access token.

Conclusion

While this specification contains many specific implementation details, these should not be construed as limitations on the scope of any disclosure or of what may be claimed, but rather as descriptions of the features specific to particular embodiments of the present disclosure. Certain features that are described herein in the context of separate embodiments may be implemented in combination to form a single embodiment. Conversely, various features that are described in the context of a single embodiment may also be implemented in multiple embodiments separately or in any suitable sub-combination thereof. Moreover, although features may be described above as acting in certain combinations and even initially claimed as such, one or more features from a claimed combination can, in some cases, be excised from the combination.

Similarly, while operations are depicted in the drawings in a particular order, this should not be understood as requiring that such operations be performed in the particular order illustrated, in a sequential order, or that all operations be performed to achieve advantageous results. In certain circumstances, multitasking and/or parallel processing may be advantageous. Moreover, the separation of various system components into eh embodiments described above should not be understood as requiring such separation in all embodiments, and it should be understood that the described program components, systems, and system components may generally be integrated together into a single software product or packaged into multiple software products.

Thus, while particular embodiments of the subject matter have been described, other embodiments are within the scope of the following claims. In some cases, the operations and/or actions recited in the claims can be performed in a different order and still achieve advantageous results. In addition, the processes depicted in the accompanying figures do not necessarily require the particular order shown, or sequential order, to achieve advantageous results.

FIGS. 4-10B illustrate flowcharts and data flows of apparatuses, methods, and the like according to example embodiments of the invention. It should be understood that each block in the flowcharts, combination of blocks in the flowcharts, step in the data flow, and combination of steps in the data flows, may be implemented by various means, such as hardware, firmware, processor, circuitry, and/or other devices associated with execution of software including one or more computer program instructions. For example, one or more of the operations described above may be embodied by computer program instructions. Any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which function specified in the flowchart blocks. The computer program instructions may be loaded onto a computer or other programmable apparatus to cause a series of operations to be performed on the computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combination of means for performing the specified functions and combinations of organizations for performing the specified functions. It will also be understood that one or more of the blocks of the flowcharts, and combination of blocks in the flowcharts, can be implemented by special purpose hardware-based computer systems which perform the specified functions, or a combination of blocks in the flowcharts, can be implemented by special purpose hardware-based computer systems that perform the specified functions, or by combinations of special purpose hardware and computer instructions.

In some embodiments, certain ones of the operations above may be modified or further amplified. Furthermore, in some embodiments, additional optional operations may be included. Modifications, additional, or amplifications to the operations above may be performed in any order and in any combination.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A group-based communication system comprising at least one processor and at least one memory, the at least one memory with computer-coded instructions therein, wherein the computer-coded instructions are configured to, when executed by the at least one processor, cause the group-based communication system to:
   receive, from a client, a first request to enable access to a first external resource from within a group-based communication interface;
   in response to the first request, transmit an approval request for an admin approval to an admin device associated with an admin user account associated with the group-based communication interface;
   receive, from the admin device, the admin approval to enable access to the client to the first external resource from within the group-based communication interface, wherein the admin approval is associated with the group-based communication interface and the first external resource;
   set a first permission status for the first external resource and a second permission status for a second external resource based at least in part on the admin approval, wherein the first permission status and the second permission status are associated with the group-based communication interface, and wherein the first external resource is different than the second external resource;
   based at least in part on receiving the admin approval, cause rendering, to the client, of the group-based communication interface including a component configured to access one or more services provided by the first external resource from within the group-based communication interface;
   receive, from the client and within the group-based communication interface, a second request to enable access to the second external resource; and
   based at least in part on receiving the second request and the second permission status for the second external resource, cause rendering, to the client, of the group-based communication interface including a component configured to access one or more services provided by the second external resource.

2. The group-based communication system as claim 1 recites, wherein the first request comprises a resource identifier associated with the first external resource and an interface identifier associated with the group-based communication interface.

3. The group-based communication system as claim 2 recites, wherein the computer-coded instructions are configured to further cause the group-based communication system to:
   determine, based at least in part on querying a group-based communication repository, an organization identifier associated with the interface identifier.

4. The group-based communication system as claim 3 recites, wherein the computer-coded instructions are configured to further cause the group-based communication system to:
   set a third permission status for the first external resource based at least in part on an additional admin approval associated with an organization-linked group-based communication interface associated with the organization identifier.

5. The group-based communication system as claim 3 recites, wherein the computer-coded instructions are configured to further cause the group-based communication system to:
   receive, from the admin device, an additional admin approval associated with an organization-linked group-based communication interface associated with the organization identifier,
   wherein causing rendering of the group-based communication interface is further based at least in part on receiving the additional admin approval.

6. The group-based communication system as claim 3 recites, wherein the computer-coded instructions are configured to further cause the group-based communication system to:
   obtain a multi-interface access token associated with the first external resource;
   generate a first single-interface access token for the group-based communication interface;
   store the first single-interface access token in association with the multi-interface access token;

generate an additional single-interface access token for the organization identifier; and store the additional single-interface access token in association with the multi-interface access token.

7. The group-based communication system as claim 3 recites, wherein the computer-coded instructions are configured to further cause the group-based communication system to:

provide, for rendering to the admin device, an administrative management interface associated with the organization identifier, the administrative management interface comprising at least the approval request; and receive the admin approval in response to user engagement with the administrative management interface.

8. A computer-implemented method comprising:

receive, from a client, a first request to enable access to a first external resource from within a group-based communication interface;

in response to the first request, transmit an approval request for an admin approval to an admin device associated with an admin user account associated with the group-based communication interface;

receive, from the admin device, the admin approval to enable access to the client to the first external resource from within the group-based communication interface wherein the admin approval is associated with the group-based communication interface and the first external resource;

set a first permission status for the first external resource and a second permission status for a second external resource based at least in part on the admin approval, wherein the first permission status and the second permission status are associated with the group-based communication interface, and wherein the first external resource is different than the second external resource;

based at least in part on receiving the admin approval, cause rendering, to the client, of the group-based communication interface including a component configured to access one or more services provided by the first external resource from within the group-based communication interface;

receive, from the client and within the group-based communication interface, a second request to enable access to the second external resource; and based at least in part on receiving the second request and the second permission status for the second external resource, cause rendering, to the client, of the group-based communication interface including a component configured to access one or more services provided by the second external resource.

9. The computer-implemented method as claim 8 recites, wherein the first request comprises a resource identifier associated with the first external resource and an interface identifier associated with the group-based communication interface.

10. The computer-implemented method as claim 9 recites, further comprising:

determining, based at least in part on querying a group-based communication repository, an organization identifier associated with the interface identifier.

11. The computer-implemented method as claim 10 recites, further comprising:

setting a third permission status for the first external resource based at least in part on an additional admin approval associated with an organization-linked group-based communication interface associated with the organization identifier.

12. The computer-implemented method as claim 10 recites, further comprising:

receiving, from the admin device, an additional admin approval associated with an organization-linked group-based communication interface associated with the organization identifier, wherein causing rendering of the group-based communication interface is further based at least in part on receiving the additional admin approval.

13. The computer-implemented method as claim 10 recites, further comprising:

obtaining a multi-interface access token associated with the first external resource;

generating a first single-interface access token for the group-based communication interface;

storing the first single-interface access token in association with the multi-interface access token;

generating an additional single-interface access token for the organization identifier; and storing the additional single-interface access token in association with the multi-interface access token.

14. The computer-implemented method as claim 10 recites, further comprising:

providing, for rendering to the admin device, an administrative management interface associated with the organization identifier, the administrative management interface comprising at least the approval request; and receiving the admin approval in response to user engagement with the administrative management interface.

15. A computer program product comprising at least one non-transitory computer-readable storage medium having computer-executable program code instructions stored therein, the computer-executable program code instructions, in execution with a processor, configured for:

receive, from a client, a first request to enable access to a first external resource from within a group-based communication interface;

in response to the first request, transmit an approval request for an admin approval to an admin device associated with an admin user account associated with the group-based communication interface;

receive, from the admin device, the admin approval to enable access to the client to the first external resource from within the group-based communication interface wherein the admin approval is associated with the group-based communication interface and the first external resource;

set a first permission status for the first external resource and a second permission status for a second external resource based at least in part on the admin approval, wherein the first permission status and the second permission status are associated with the group-based communication interface, and wherein the first external resource is different than the second external resource;

based at least in part on receiving the admin approval, cause rendering, to the client, of the group-based communication interface including a component configured to access one or more services provided by the first external resource from within the group-based communication interface;

receive, from the client and within the group-based communication interface, a second request to enable access to the second external resource; and based at least in part on receiving the second request and the second permission status for the second external resource, cause rendering, to the client, of the group-based communication interface including a component configured to access one or more services provided by the second external resource.

16. The computer program product as claim 15 recites, wherein the first request comprises a resource identifier associated with the first external resource and an interface identifier associated with the group-based communication interface.

17. The computer program product as claim 16 recites, further comprising program code instructions for:
   determining, based at least in part on querying a group-based communication repository, an organization identifier associated with the interface identifier.

18. The computer program product as claim 17 recites, further comprising program code instructions for:
   setting a third permission status for the first external resource based at least in part on an additional admin approval associated with an organization-linked group-based communication interface associated with the organization identifier.

19. The computer program product as claim 17 recites, further comprising program code instructions for:
   receiving, from the admin device, an additional admin approval associated with an organization-linked group-based communication interface associated with the organization identifier,
   wherein causing rendering of the group-based communication interface is further based at least in part on receiving the additional admin approval.

20. The computer program product as claim 17 recites, further comprising program code instructions for:
   obtaining a multi-interface access token associated with the first external resource;
   generating a first single-interface access token for the group-based communication interface;
   storing the first single-interface access token in association with the multi-interface access token;
   generating an additional single-interface access token for the organization identifier; and
   storing the additional single-interface access token in association with the multi-interface access token.

* * * * *